United States Patent
Wegelin et al.

(10) Patent No.: US 10,233,620 B2
(45) Date of Patent: Mar. 19, 2019

(54) POWERED COMMUNICATION CONNECTION

(71) Applicant: GOJO Industries, Inc., Akron, OH (US)

(72) Inventors: Jackson William Wegelin, Stow, OH (US); Nick Ermanno Ciavarella, Seven Hills, OH (US); Stephen Levy, Erie, PA (US)

(73) Assignee: GOJO Industries, Inc., Akron, OH (US)

( * ) Notice: Subject to any disclaimer, the term of this patent is extended or adjusted under 35 U.S.C. 154(b) by 352 days.

(21) Appl. No.: 14/599,406

(22) Filed: Jan. 16, 2015

(65) Prior Publication Data
US 2015/0207275 A1    Jul. 23, 2015

Related U.S. Application Data

(60) Provisional application No. 61/928,522, filed on Jan. 17, 2014.

(51) Int. Cl.
*A47K 5/12*   (2006.01)
*E03C 1/05*   (2006.01)
(Continued)

(52) U.S. Cl.
CPC ............ *E03C 1/057* (2013.01); *A47K 5/1217* (2013.01); *A47K 10/24* (2013.01); *A47K 2010/3226* (2013.01); *A47K 2201/00* (2013.01)

(58) Field of Classification Search
CPC .......... A47K 5/1217; A47K 2010/3233; A47K 2201/02; E03C 1/055; E03C 1/057
(Continued)

(56) References Cited

U.S. PATENT DOCUMENTS 6,131,773 A  * 10/2000 Wade ................... A47K 5/1215
                                                    222/153.02
6,805,262 B1 * 10/2004 Frazier ................. A47K 5/1214
                                                    221/96
(Continued)

FOREIGN PATENT DOCUMENTS

DE    19846546 A1 *  4/2000 ........... A47K 5/1217
EP     1671568 A2     6/2006
(Continued)

OTHER PUBLICATIONS

Machine Translation DE19846546A1, https://worldwide.espacenet.com/publicationDetails/description?CC=DE&NR=19846546A1&KC=A1&FT=D&ND=3&date=20000413&DB=&Locale=en_EP; Nov. 13, 2017 (Year: 2017).*
(Continued)

*Primary Examiner* — Ryan D Kwiecinski
(74) *Attorney, Agent, or Firm* — Cooper Legal Group, LLC

(57) ABSTRACT

One or more techniques and/or systems are provided for providing power and/or communication to a device, such as a dispenser, a flush valve of a bathroom device, a hygiene opportunity measurement device, a hands free faucet, etc. For example, a mounting system comprises a mounting plate that may attach to a structure, such as a wall. The mounting plate may comprise a mounting connector that may be configured to mate with a device connector of the device to establish a connection. Power may be provided to the device through the connection. A communication may be provided for the device through the connection. For example, the device may send current device statuses, usage metrics, and/or other information to a remote source. The remote source may send instructions, data collection requests, functionality changes, and/or other information to the device.

12 Claims, 25 Drawing Sheets

(51) Int. Cl.
*A47K 10/24* (2006.01)
*A47K 10/32* (2006.01)

(58) Field of Classification Search
USPC .................. 222/181, 181.3; 248/309.1, 674; 340/693.9, 693.11
See application file for complete search history.

(56) References Cited

U.S. PATENT DOCUMENTS

| | | | |
|---|---|---|---|
| 7,320,418 B2* | 1/2008 | Sassoon | A61L 2/18 222/1 |
| 7,527,178 B2* | 5/2009 | Lewis | A47K 5/1204 222/105 |
| 8,590,362 B2 | 11/2013 | Carbone et al. | |
| 2002/0074356 A1* | 6/2002 | Lewis | A47K 5/1204 222/181.3 |
| 2007/0257058 A1* | 11/2007 | Ophardt | A47K 5/12 222/129 |
| 2008/0165474 A1* | 7/2008 | McCoy | F25D 23/12 361/728 |
| 2009/0266443 A1 | 10/2009 | Browne-Wilkinson | |
| 2010/0163573 A1* | 7/2010 | Wegelin | B67D 1/0078 222/1 |
| 2012/0031922 A1* | 2/2012 | Johnson | A47K 5/1217 222/23 |
| 2012/0148195 A1 | 6/2012 | Umeno | |
| 2012/0228326 A1* | 9/2012 | Ciavarella | G09F 7/18 222/108 |
| 2013/0206944 A1* | 8/2013 | Merck | H01F 27/02 248/309.1 |
| 2014/0359935 A1* | 12/2014 | Veros | E03C 1/055 4/677 |
| 2015/0207275 A1* | 7/2015 | Wegelin | F16M 13/02 248/542 |
| 2016/0309967 A1* | 10/2016 | Pelfrey | A47K 5/1217 |
| 2017/0049276 A1* | 2/2017 | Lightner | A47K 5/1202 |

FOREIGN PATENT DOCUMENTS

| | | | |
|---|---|---|---|
| WO | 1992008671 A1 | 5/1992 | |
| WO | 94/20407 A1 | 9/1994 | |
| WO | WO-9420407 A1 * | 9/1994 | ............... A47K 5/12 |
| WO | 2008027941 A2 | 3/2008 | |
| WO | 2009034592 A1 | 3/2009 | |
| WO | 2012161766 A1 | 11/2012 | |
| WO | 2013010928 A2 | 1/2013 | |

OTHER PUBLICATIONS

Invitation to Pay Additional Fees and Partial Int. Search Report cited in PCT Application No. PCT/US2015/011868 dated Apr. 7, 2015, 6 pgs.
Int. Search Report/Written Opinion cited in PCT/U52015/011868 dated Aug. 14, 2015, 20 pgs.
EP Search Report cited in EP Application No. 17203569.3 dated Jan. 23, 2018, 10 pgs.

* cited by examiner

POWERED COMMUNICATION CONNECTION

CROSS-REFERENCE TO RELATED APPLICATIONS

This application claims priority to U.S. Provisional Patent Application No. 61/928,522, filed on Jan. 17, 2014, the entire disclosure of which is hereby incorporated by reference.

TECHNICAL FIELD

The instant application is generally directed towards mounting systems for devices, such as dispensers, flush valves, faucet, etc. For example, the instant application is directed to methods and/or systems for providing power and communication to such devices.

BACKGROUND

Many locations, such as hospitals, factories, restaurants, homes, etc., utilize devices for hygiene, such as dispensers to dispense material, touch free faucets for sinks, and/or flush valves for toilets or other bathroom devices. For example, a dispenser may dispense a liquid material, powder material, aerosol material, and/or other materials (e.g., soap, anti-bacterial gels, cleansers, disinfectants, lotions, etc.). Some dispensers utilize a refill container for ease of maintenance, environmental concerns, etc. The refill container may, for example, comprise a pump and/or nozzle mechanism that can be used by a dispenser to dispense material from the refill container. Dispenser and/or other devices may utilize power, such as batteries or an AC adapter, for operation.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for providing a device with power and/or communication are provided herein. In an example, a mounting system can be provided for providing at least one of power or communication to a dispenser. The mounting system comprises a mounting plate configured to mount to a structure. The mounting plate comprises a mounting configuration configured to attach the dispenser to the mounting plate. The mounting plate comprises a mounting connector configured to mate with a device connector of the dispenser to establish a connection between the mounting plate and the dispenser. The mounting connector is configured to at least one of provide power for the dispenser through the connection or provide a communication for the dispenser through the connection. The mounting system comprises a stepdown voltage device supported by at least one of the mounting plate or the dispenser. The stepdown voltage device is configured to step down a voltage of the power to less than about 18 volts.

In another example, a dispenser is configured to mate with a mounting plate for power and communication. The dispenser comprises a device housing comprising a device mounting configuration configured to attach to the mounting plate of a mounting system. The device housing comprises a device connector that is configured to mate with a mounting connector of the mounting plate to establish a connection between the dispenser and the mounting plate, receive power for the dispenser through the connection, and establish a communication for the dispenser through the connection.

In another example, a method for providing power and communication to a dispenser comprises attaching the dispenser to a mounting plate of a mounting system. The method comprises mating a device connector of the dispenser with a mounting connector of the mounting plate to establish a connection between the dispenser and the mounting plate. The method comprises providing power to the dispenser through the connection. The method comprises providing a communication for the dispenser through the connection.

In another example, a mounting system for providing at least one of power or communication to a device is provided. The mounting system comprises a mounting plate configured to mount to a structure. The mounting plate comprises a mounting configuration comprising a keying feature that is configured to allow for removable attachment of the device to the mounting plate when the device satisfies the keying feature and inhibit attachment of the device to the mounting plate when the device does not satisfy the keying feature. The mounting plate comprises a mounting connector configured to mate with a device connector of the device to establish a connection between the mounting plate and the device. The mounting connector is configured to at least one of provide power for the device through the connection or provide a communication for the device through the connection. The mounting system comprises at least one of an arresting portion or an attachment portion supported on at least one of the mounting plate or the device. The arresting portion is configured to inhibit the attachment of the device to the mounting plate when the device does not satisfy the keying feature. The attachment portion is configured to allow for the removable attachment of the device to the mounting plate when the device satisfies the keying feature.

In another example, a method for electrically keying a mounting plate to a dispenser is provided. The method comprises positioning a dispenser in proximity to a mounting plate attached to a stationary mounting surface. The method comprises facilitating a transfer of information, to allow for attachment of the dispenser to the mounting plate, between at least two of the mounting plate, the dispenser, and an external device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
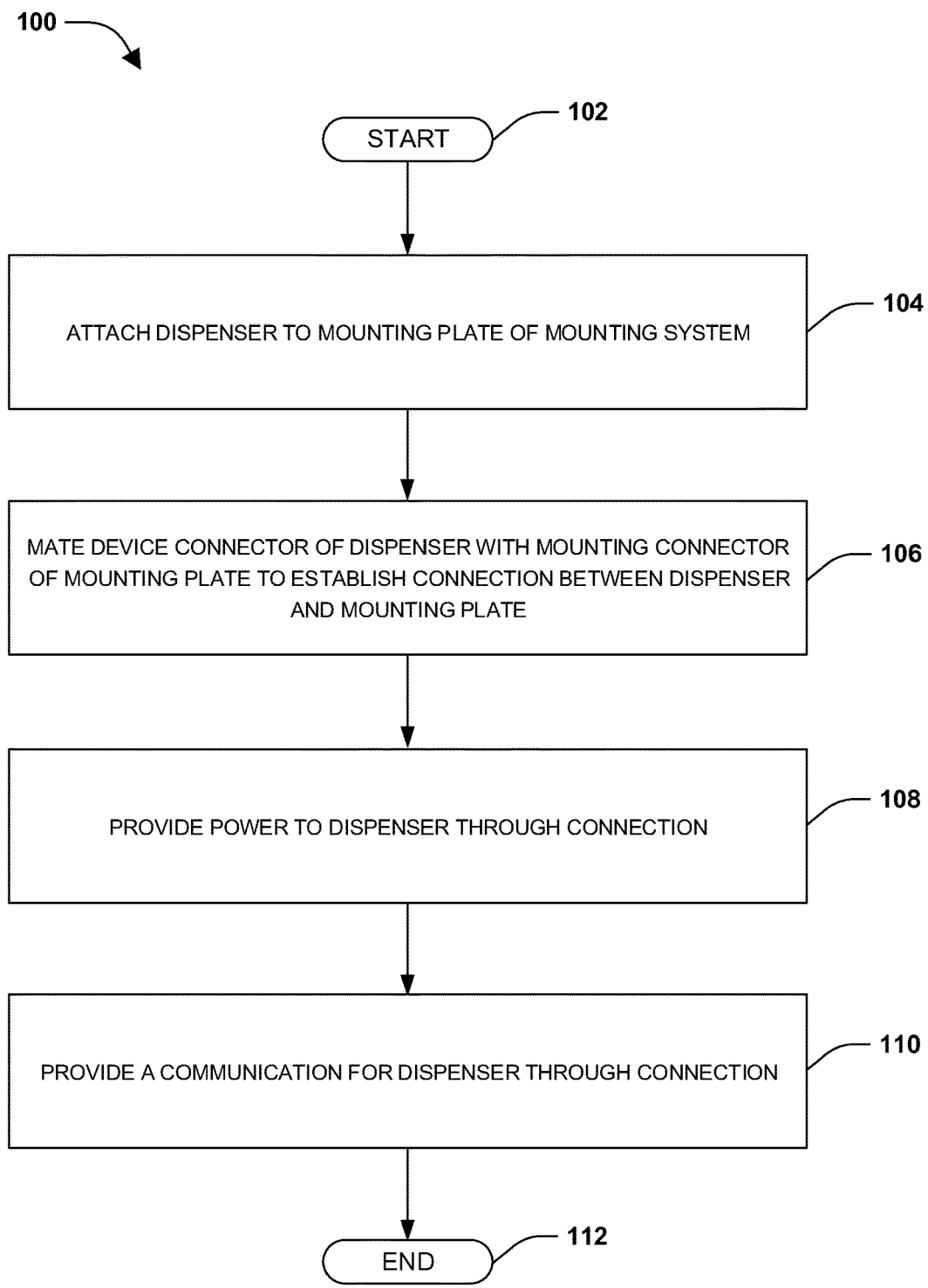
FIG. 1A is a flow diagram illustrating an exemplary method of providing power and/or communication to a device.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of providing power and/or communication to a device (e.g., a dispenser) is illustrated by an exemplary method 100 of FIG. 1. At 102, the method starts. In some examples, the device comprises a bathroom device, a hygiene device, a dispenser, a faucet (e.g., a touch free or automated faucet), a flush valve, a hygiene opportunity measurement device (e.g., a people counter that identifies a number of hygiene opportunities based upon a count of people such as a number of people entering a bathroom; a zone sensor that identifies a hygiene opportunity based upon an identification of a person within a zone such as a nurse come within a proximity of a patient's bed, etc.), and/or other device that may utilize power and/or communication such as a paper towel dispenser. At 104, the device (e.g., the dispenser) may be attached to a mounting plate of a mounting system. For example, the dispenser may comprise a device housing (e.g., the device housing may house a drive train, a motor, a refill container of a material dispensed by the dispenser, and/or other dispenser components). The device housing may comprise a device mounting configuration (e.g., screws, hooks, and/or other attachment components) that is configured to attach to a mounting configuration of the mounting plate (e.g., screw holes, a bracket, and/or other attachment components). In this way, the dispenser may be attached to the mounting plate, such as by utilizing the device mounting configuration of the device and/or the mounting configuration of the mounting plate.

At 106, a device connector of the dispenser may be mated with a mounting connector of the mounting plate to establish a connection between the dispenser and the mounting plate. For example, the connection may comprise a power over Ethernet connection, a blind mounted Ethernet connection, a cat-5 connection, a telephony connection, and/or other interface connection that may provide connectivity and/or power for the dispenser (e.g., a connection having a voltage proportional to a device voltage of the dispenser, such as a voltage that may be dropped to about 42 v or less to avoid a dry shock hazard or to about 18 v or less to avoid a wet shock hazard). In an example, the mounting connector may be configured according to a floating configuration to aid in mating. In another example, the device connector may be configured according to a floating configuration to aid in mating. In an example, the mounting plate may comprise a protection structure (e.g., a seal, a seal ring, a gasket, a rib, etc.) that may be configured to protect the mounting connector and/or the dispenser connector. For example, the protection structure may protect such connectors from moisture, dirt, debris, physical damage, liquids (e.g., glass cleaner that may run down a mirror between the dispenser and the mounting system), etc.

At 108, power may be provided to the dispenser through the connection. For example, the power may be used for operation of the dispenser, to display a visualization (e.g., an image, a logo, lights, a video, an advertisement, etc.), for communication, and/or other purposes. In an example, the dispenser and/or the mounting system may comprise a stepdown voltage device configured to step down a voltage provided by the connection based upon a device voltage for the device. For example, a power over Ethernet connection may provide 50 v, which may be dropped to about 42 v or less to mitigate dry shock hazards or to about 18 v or less to mitigate wet shock hazards. In another example, the dispenser and/or the mounting system may comprise a current limiting device configured to limit current associated with the connection based upon a device current for the device. For example, the current limiting device may limit the current such that the power provided to the device is less than 15 w to mitigate fire hazards. In another example, the dispenser and/or the mounting system may comprise a ground fault circuit interrupter associated with the connection. In this way, power may be provided to the dispenser through the connection, such as in a safe manner.

At 110, a communication may be provided for the dispenser through the connection. For example, the mounting connector of the mounting plate, the device connector of the dispenser, and/or a communication module of the dispenser may facilitate communication between the dispenser and a remote device. In an example, the communication module may be configured to provide a current device status (e.g., operational, low battery, a detected clog, a detected mechanical impedance, a detection of a hygiene opportunity such as a nurse walking into a patient's room, etc.), a usage metric (e.g., an amount of water used by a faucet or toilet, an amount of material dispensed by a dispenser, etc.), maintenance information (e.g., a time since last maintenance, such as installation of a new refill container for a dispenser or cleaning of a toilet), a heartbeat (e.g., for inventory purposes), a list of functionality supported by the device (e.g., RF functionality, audio functionality, visualization display functionality, etc.), a current visualization displayed by the device (e.g., an ad, a message, a video, etc.), an identified hygiene opportunity (e.g., in a hospital setting, etc.), a service request (e.g., a request for maintenance, repair, replacement, etc.), a refill level (e.g., an amount of material remaining within a refill container of a dispenser, etc.), and/or other information through the connection to the remote device.

In another example, the communication module of the device may be configured to receive an instruction (e.g., an instruction to emit an RF signal for service), a data collection request (e.g., a request for a battery level, a refill level, an error message, etc.), a dispense material amount change (e.g., a decrease or increase in an amount of material dispensed by a dispenser or water used by a faucet or other bathroom device), a display service indicator instruction (e.g., an instruction to blink an LED), a change display visualization instruction (e.g., a new advertisement may be provided for display by the device), a functionality change, and/or a variety of other information through the connection from the remote device. In this way, the connection may provide power and/or connectivity (e.g., a communication) for the device. It will be appreciated that providing for power and a communication through the connection comprises providing for the ability and/or the means to provide power and communication. At 112, the method ends.

Figure 1B:
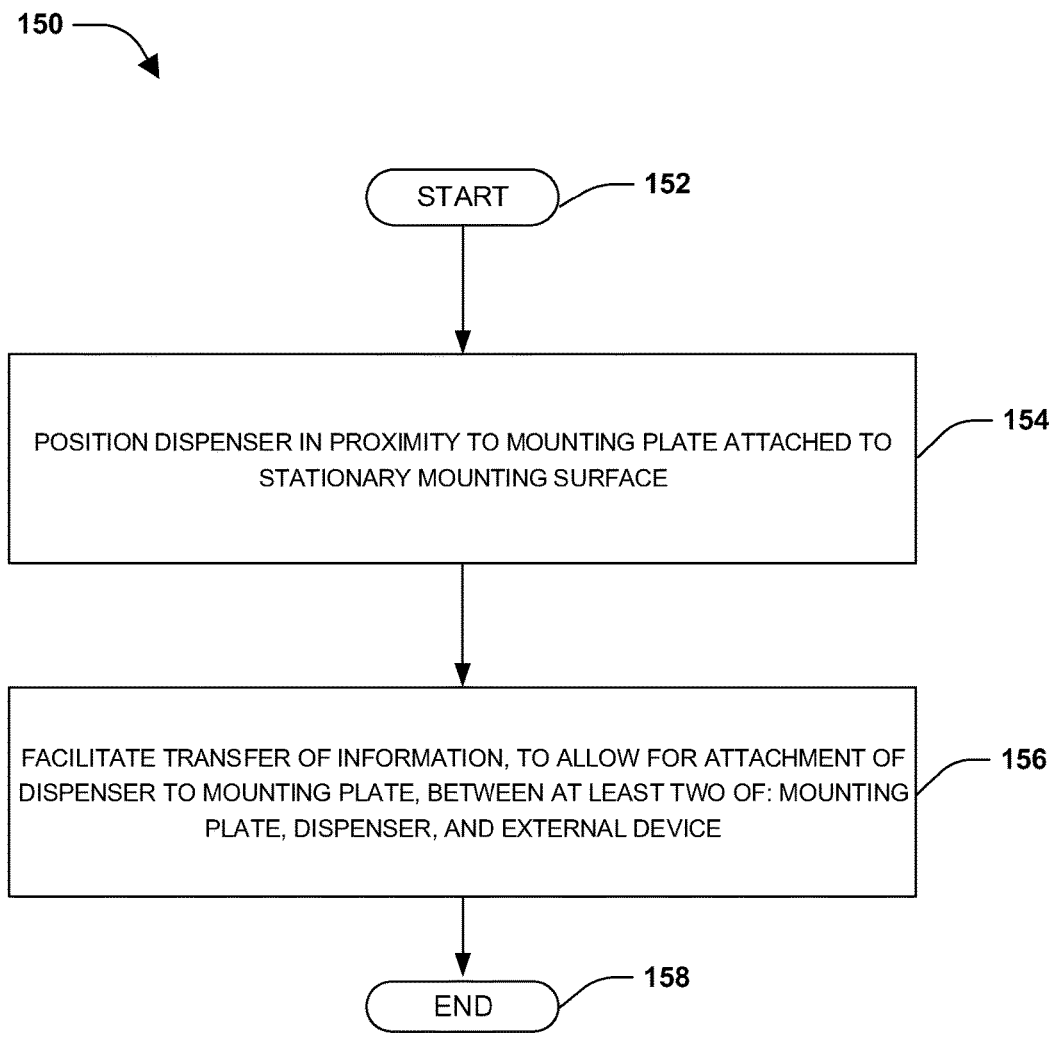
FIG. 1B is a flow diagram illustrating an exemplary method of electrically keying a mounting plate to a dispenser.

FIG. 1B illustrates an exemplary method for electrically keying a mounting plate to a dispenser. At 152, the method starts. At 154, the method comprises positioning a dispenser in proximity to a mounting plate that is attached to a stationary mounting surface. In an example, by being positioned in proximity to the mounting plate, the dispenser can be within a distance (e.g., less than about 10 feet, less than about 5 feet, less than about 3 feet, etc.) from the mounting plate. The mounting plate can be attached to any number of stationary mounting surfaces, including walls, doors, windows, ceilings, or the like.

At 156, the method comprises facilitating a transfer of information, to allow for attachment of the dispenser to the mounting plate, between at least two of the mounting plate, the dispenser, and an external device. In an example, this transfer of information is configured to allow for removable attachment of the dispenser to the mounting plate when a keying feature is satisfied. In another example, this transfer of information is configured to inhibit attachment of the dispenser to the mounting plate when the dispenser does not satisfy the keying feature. The external device comprises, for example, a mobile device (e.g., a mobile phone, handheld device, tablet, etc.), a fob, or other devices that are capable of transmitting and/or receiving information. At 158, the method ends.

Figure 2A:
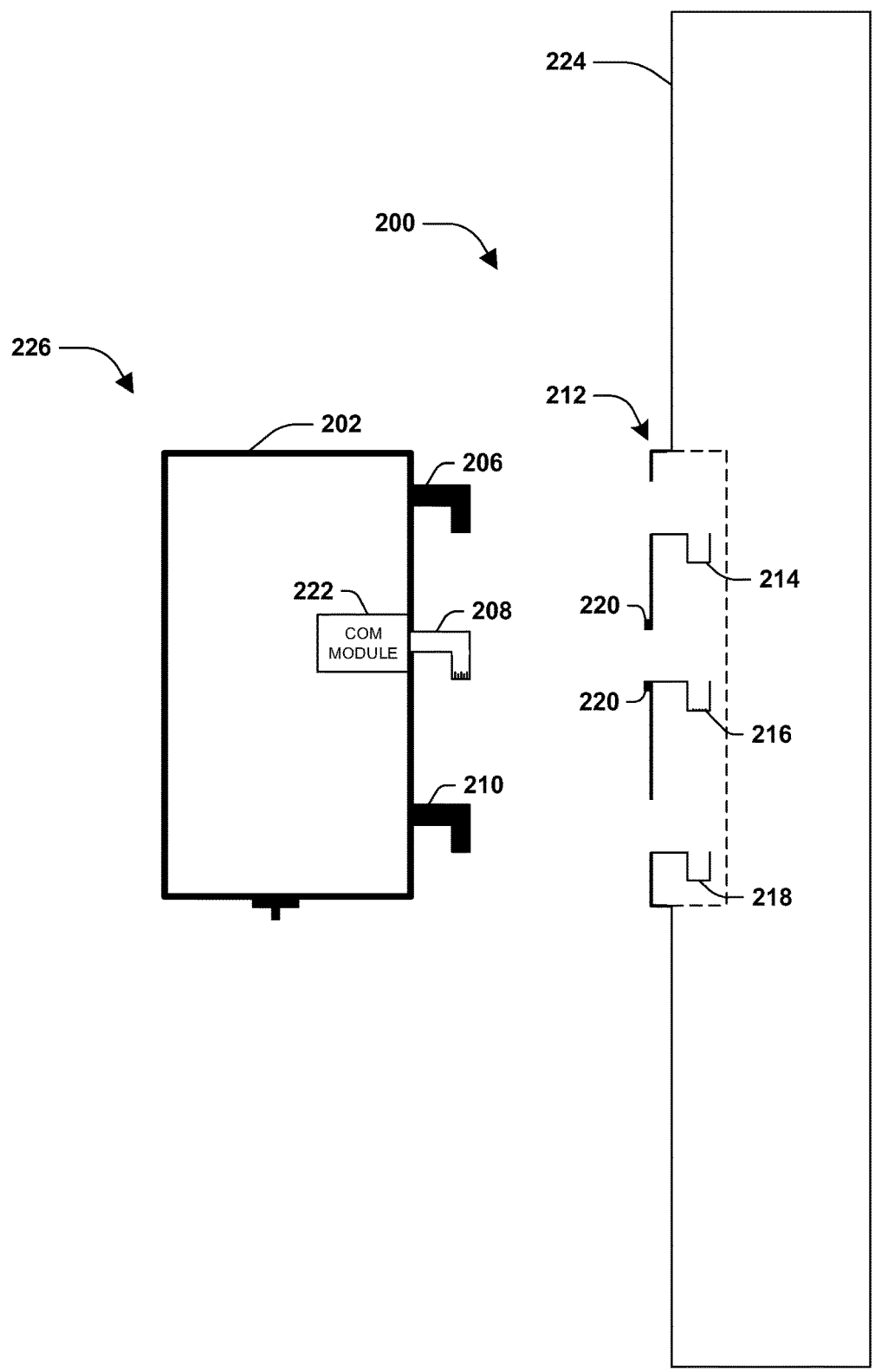
FIG. 2A is a component block diagram illustrating an exemplary mounting system for providing power and/or communication to a device.
Figure 2B:
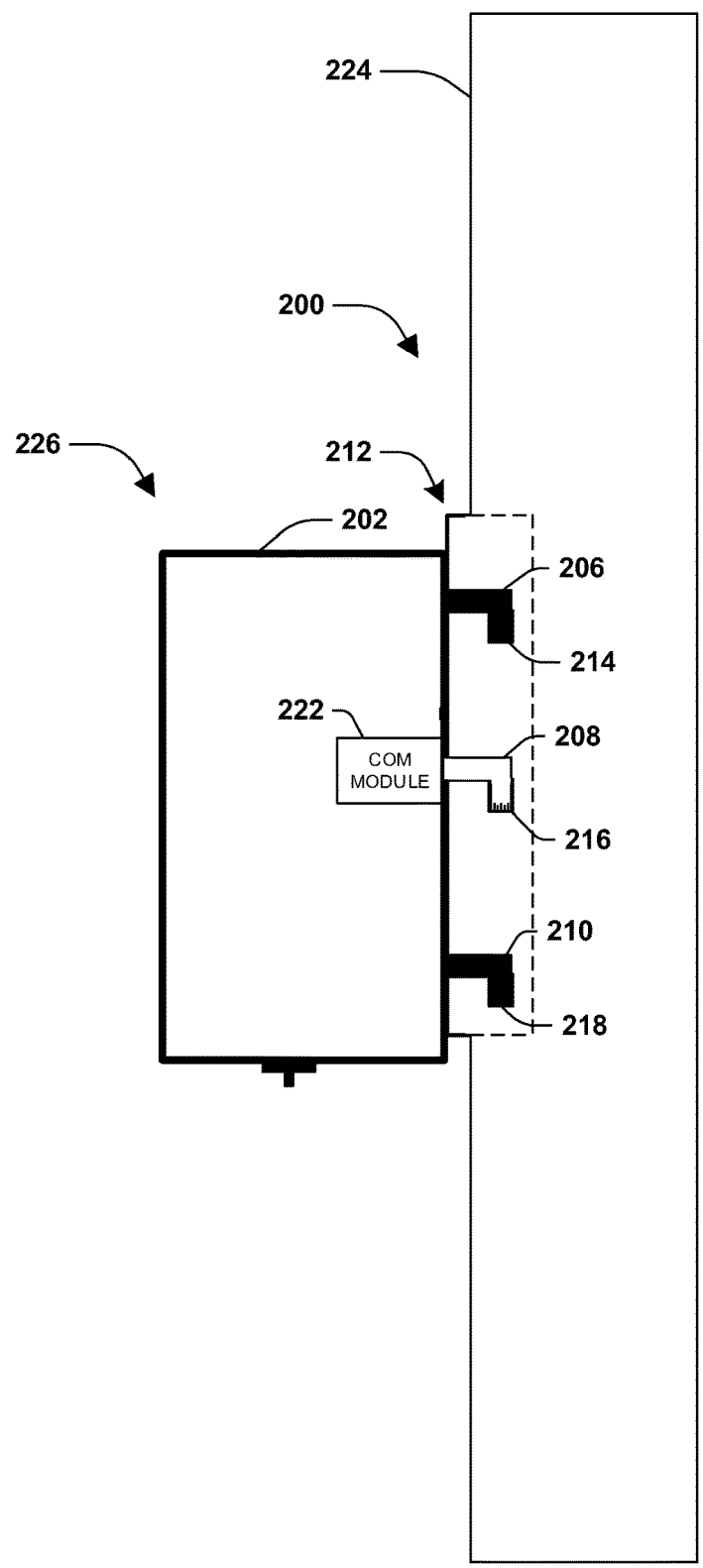
FIG. 2B is an illustration of an example of a device attached to a mounting system.

FIG. 2A illustrates an example of a mounting system 200 for providing at least one of power or communication to a device 226, such as a dispenser. The mounting system 200 comprises a mounting plate 212. The mounting plate 212 may be configured to mount to a structure 224 (e.g., a wall). The mounting plate 212 may comprise a mounting configuration (e.g., a first mounting slot 214 and a second mounting slot 218). The mounting configuration may be configured to attach the device 226 to the mounting plate 212. For example, a device mounting configuration (e.g., a first hook 206 and a second hook 210) may attach to the mounting configuration of the mounting plate 212, as illustrated in FIG. 2B where the first hook 206 attaches/mates with the first mounting slot 214 and the second hook 210 attaches/mates with the second mounting slot 218. Once the device 226 is attached to the mounting plate 212, a protection structure 220, such as a seal, may be configured to protect a mounting connector 216 of the mounting plate 212 and/or a device connector 208 of the device 226 (e.g., protection from liquid that may leak down the structure 224 between the device 226 and the mounting plate 212.

Figure 2C:
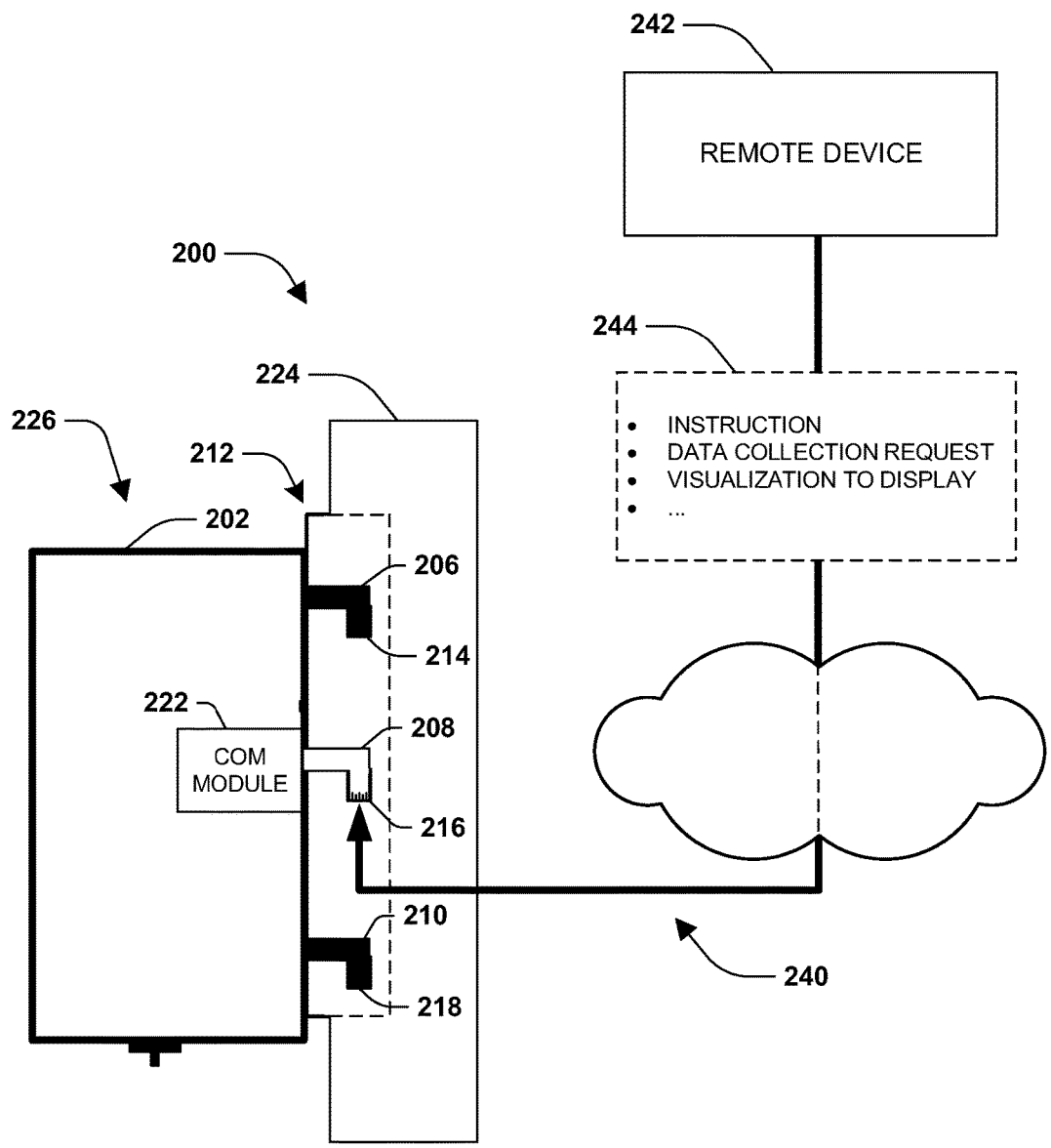
FIG. 2C is an illustration of an example of facilitating communication between a device and a remote device.
Figure 2D:
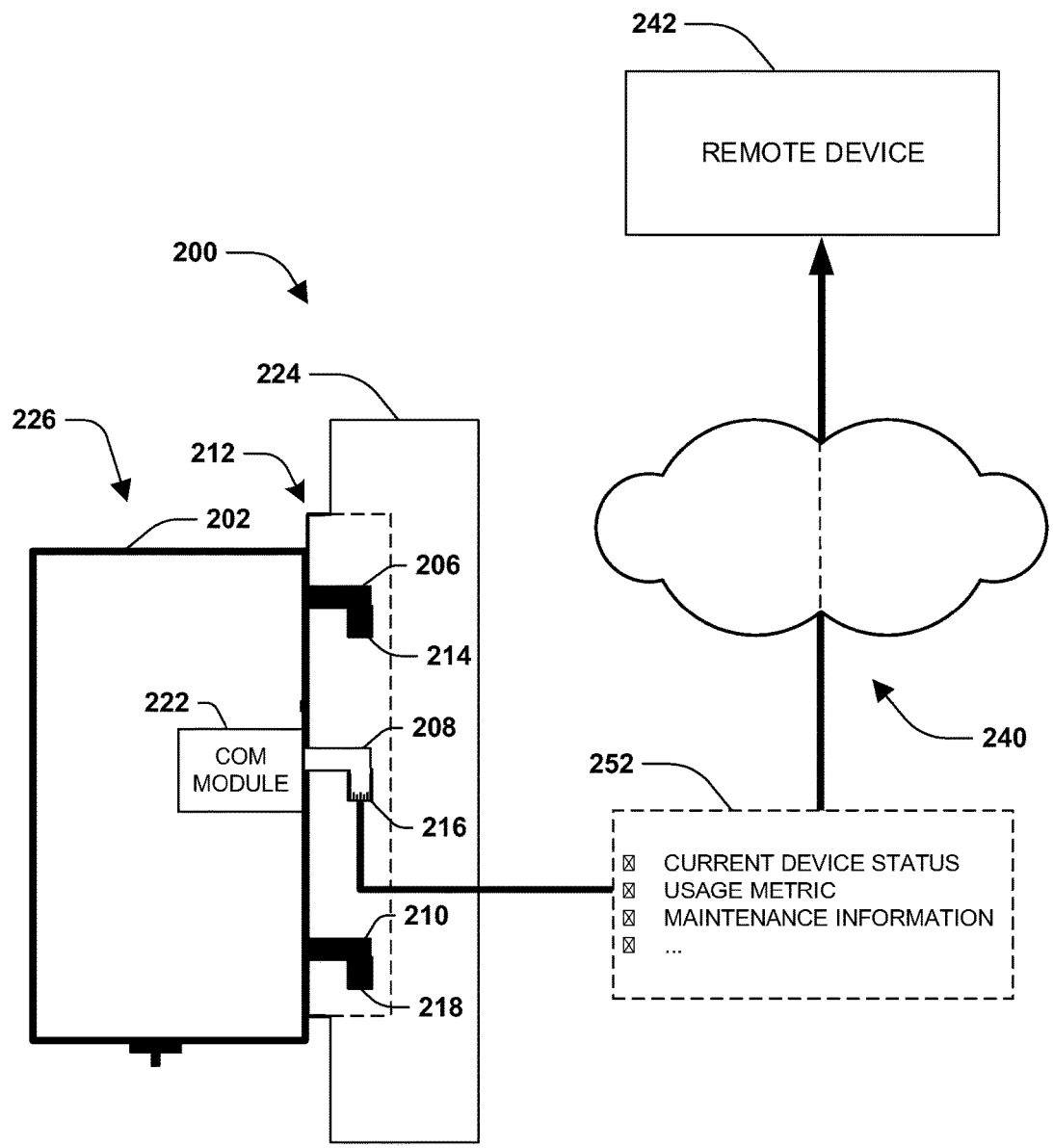
FIG. 2D is an illustration of an example of facilitating communication between a device and a remote device.

The mounting plate 212 may comprise the mounting connector 216 (e.g., a hidden power over Ethernet connector) configured to mate with the device connector 208 of the device 226 (e.g., the device connector 208 may extend out and then down from the device housing 202) to establish a connection 240, as illustrated in FIGS. 2B-2D. The device 226 may comprise a device housing 202. The device housing 202 may comprise a communication module 222 associated with the device connector 208. The communication module 222 may be configured to facilitate a communication over the connection 240 between the device 226 and a remote device 242. In an example, the communication may be facilitated from the remote device 242, over the connection 240, to the device 226, as illustrated in FIG. 2C. For example, the remote device 242 may send information 244, such as an instruction, a data collection request, a software update, a visualization to display, and/or over information, over the connection 240 through the mounting connector 216 and the device connector 208 to the communication module 222 for processing. In another example, the communication may be facilitated from the device 226, over the connection 240, to the remote device 242, as illustrated in FIG. 2D. For example, the communication module 222 of the device 226 may send information 252, such as a current device status, a usage metric, detected hygiene opportunities, maintenance information, and/or other information, through the device connector 208 and the mounting connector 216 and over the connection 240 to the remote device 242.

Figure 2E:
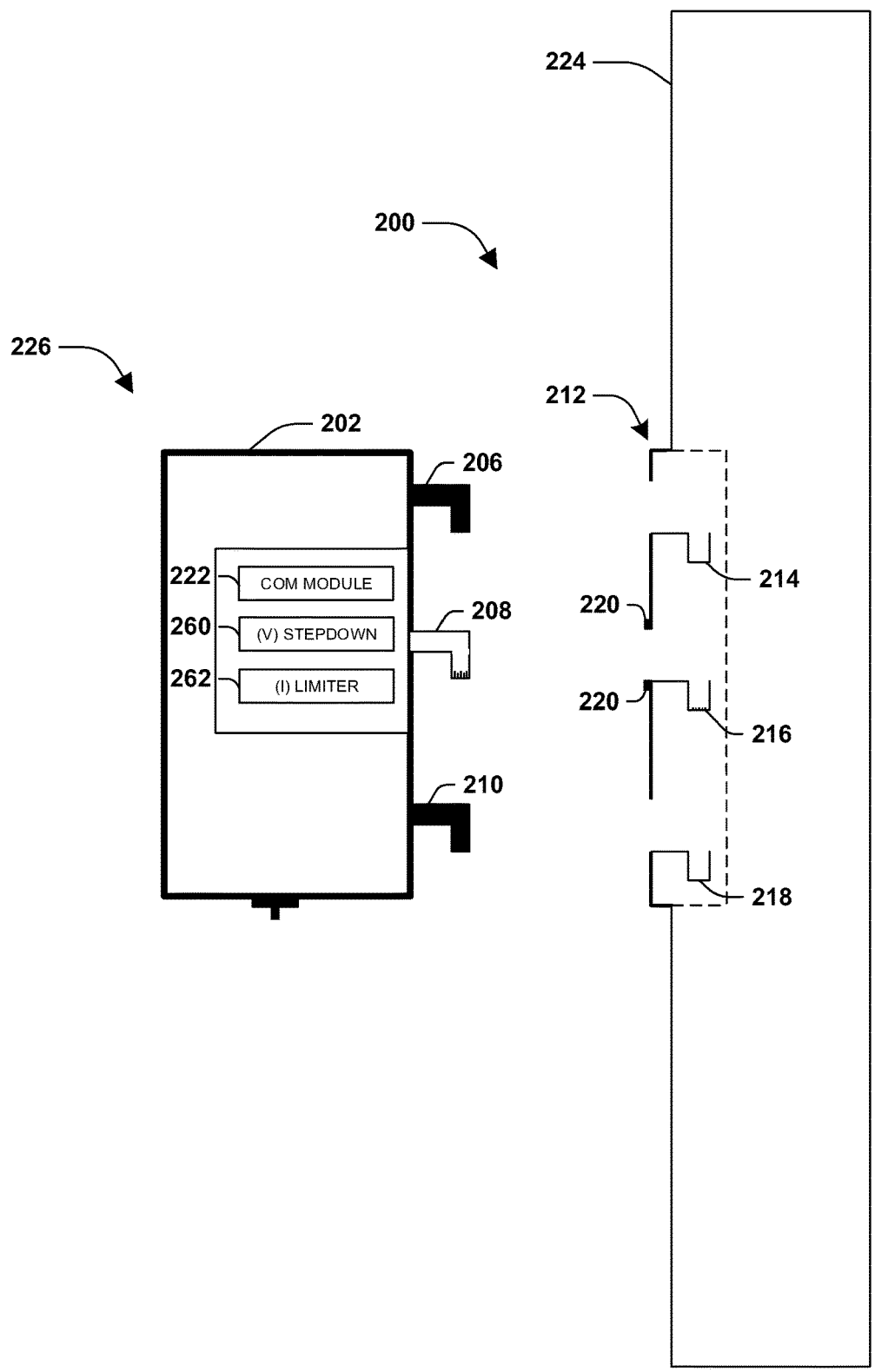
FIG. 2E is an illustration of a device comprising a stepdown voltage device and a current limiting device.
Figure 2F:
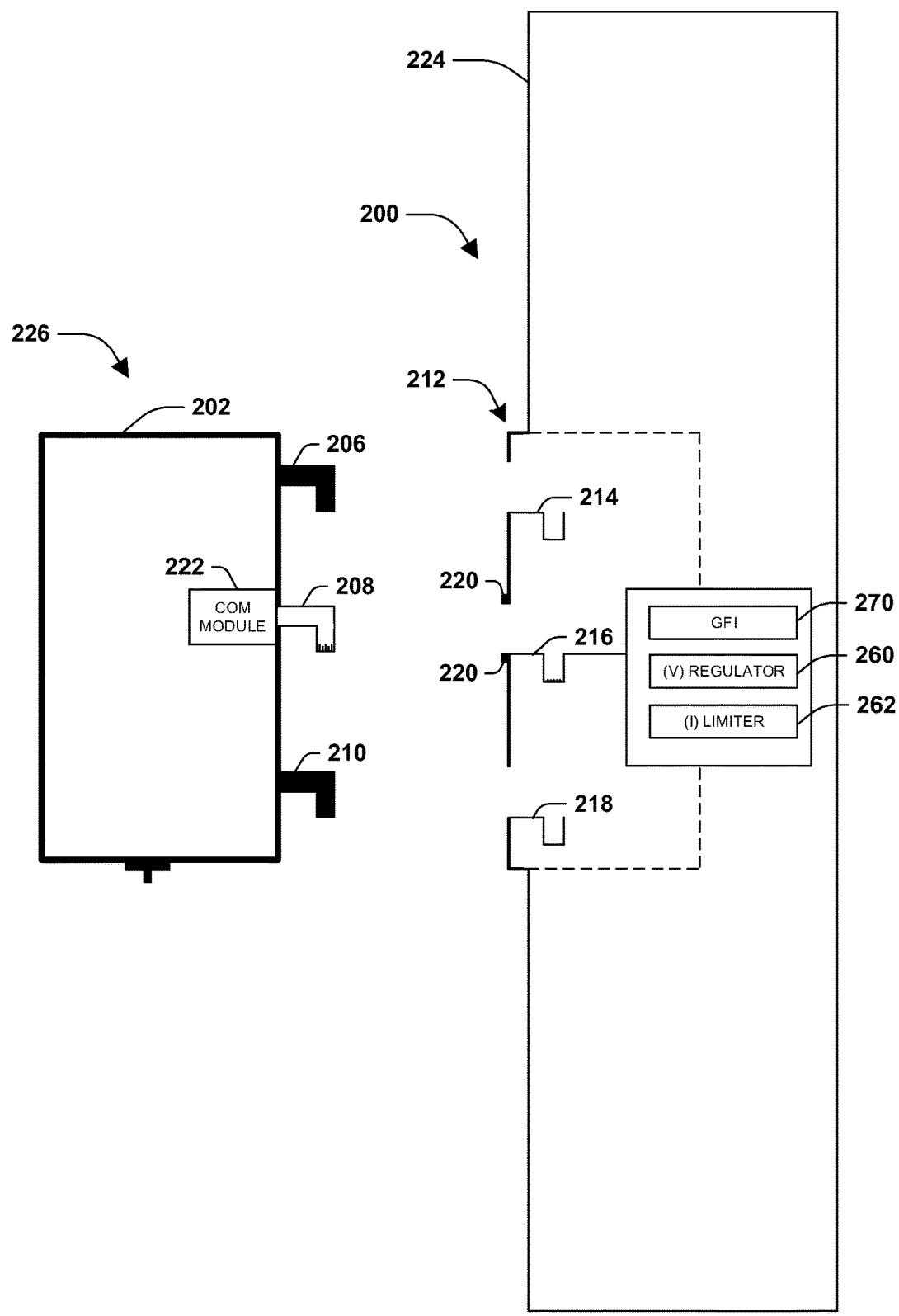
FIG. 2F is an illustration of a mounting plate comprising a stepdown voltage device, a current limiting device, and a ground fault circuit interrupter.

In an example, the device 226 comprises a stepdown voltage device 260 and/or a current limiting device 262, as illustrated in FIG. 2E. In another example, the mounting plate 212 comprise the stepdown voltage device 260 and/or the current limiting device 262, as illustrated in FIG. 2F. The stepdown voltage device 260 may be configured to step down a voltage of power associated with the connection 240 based upon a device voltage for the device 226 (e.g., to obtain a voltage of about 18 v or less to mitigate wet shock hazards). The current limiting device 262 may be configured to limit a current associated with the connection 240 based upon a device current rating for the device 226 (e.g., to obtain a power of about 15 w or less to mitigate fire hazards). In an example, the mounting plate 212 comprises a ground fault circuit interrupter 270 for the connection 240, as illustrated in FIG. 2F. The ground fault circuit interrupter 270 may be configured to protect a network associated with the connection 240 and/or other devices connected to the network, such as a second dispenser or a flush valve. In this way, power and/or communication may be provided to the device 226 by the mounting system 200 in a relatively safe manner.

It will be appreciated that the stepdown voltage device 260 and/or the current limiting device 262 can be supported by the mounting plate 212 and/or the device 226 (e.g., the dispenser). In the illustrated example of FIG. 2E, the stepdown voltage device 260 and the current limiting device 262 are supported by the device 226 (e.g., the dispenser). In such an example, the voltage of the power that is supplied to the device 226 (e.g., the dispenser) is stepped down to less than about 18 volts within the device 226. Likewise, in such an example, the current that is supplied to the device 226 is limited within the device 226. In other examples, similar functions of the stepdown voltage device 260 and/or the current limiting device 262 can be accomplished by supporting the stepdown voltage device 260 and/or the current limiting device 262 within the mounting plate 212.

Figure 3A:
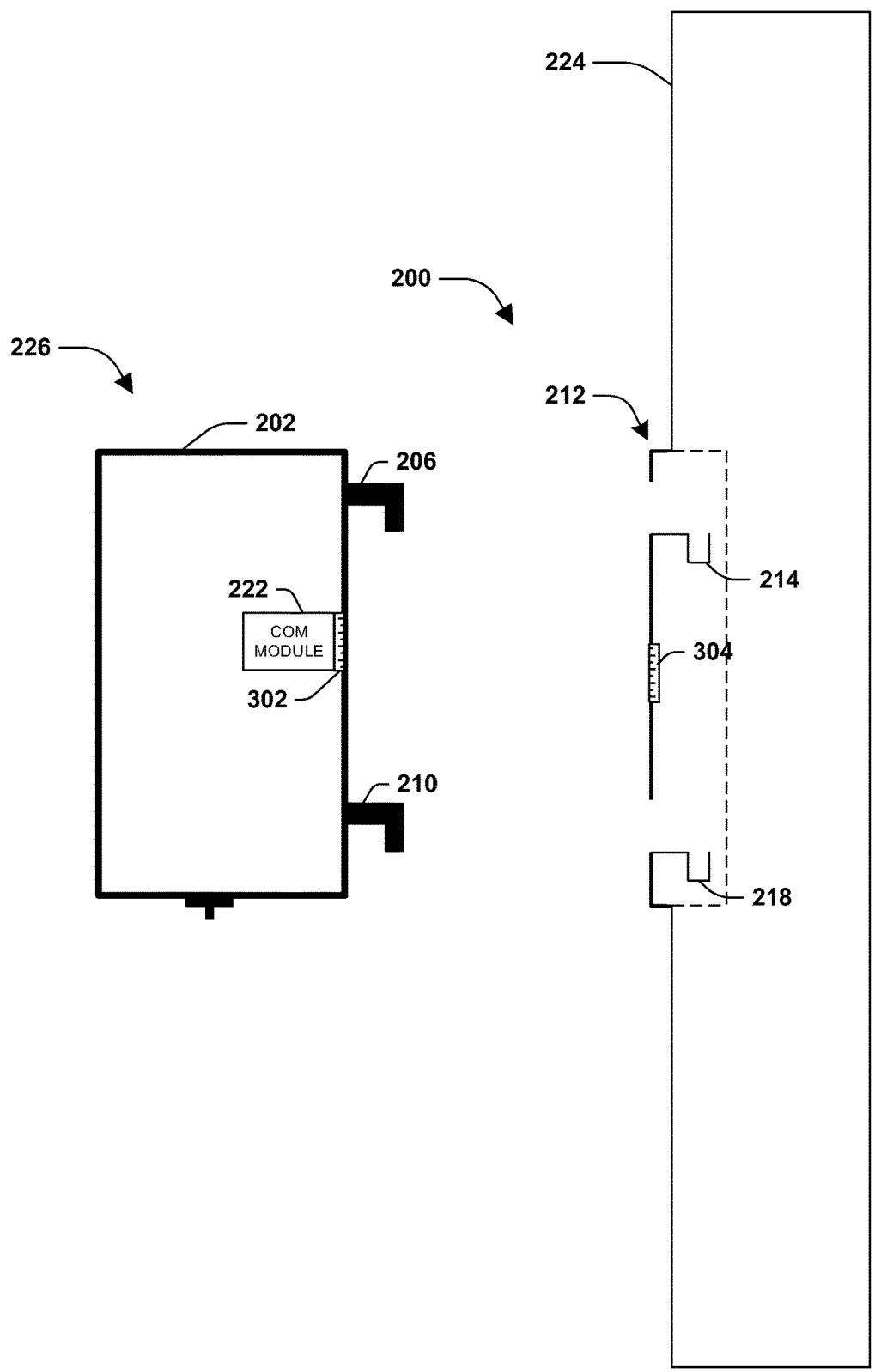
FIG. 3A is a component block diagram illustrating an exemplary mounting system for providing power and/or communication to a device.
Figure 3B:
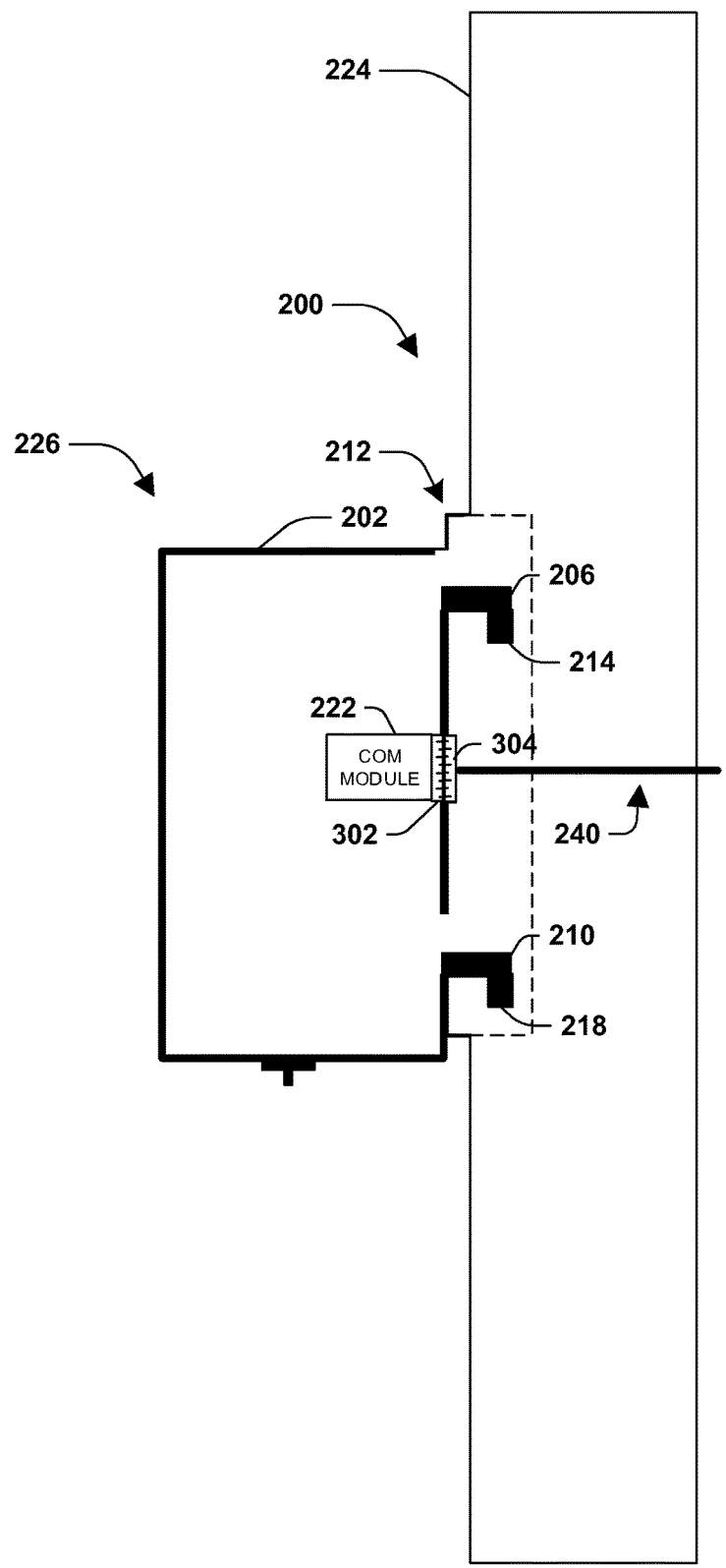
FIG. 3B is an illustration of an example of a device attached to a mounting system.

It may be appreciated that various device connector configurations and/or mounting connector configurations are contemplated herein. In an example, the device 226 may comprise a device connector 302, which may be relatively flush with the device housing 202, as illustrated in FIG. 3A. The mounting plate 212 may comprise a mounting connector 304, which may be relatively flush with the mounting plate 212. When mated, the device connector 302 may operatively couple to the mounting connector 304 to establish the connection 240, as illustrated in FIG. 3B.

Figure 4A:
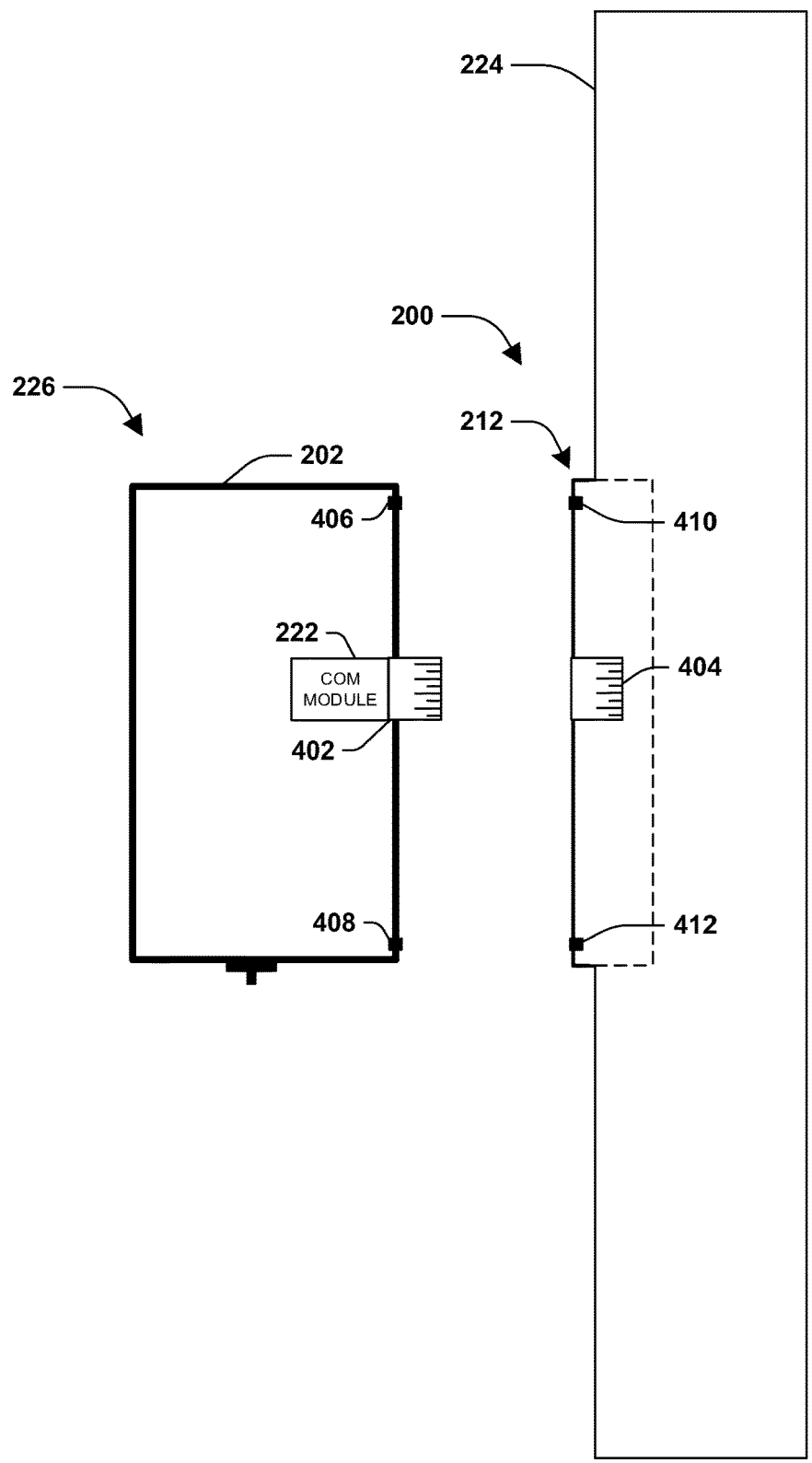
FIG. 4A is a component block diagram illustrating an exemplary mounting system for providing power and/or communication to a device.
Figure 4B:
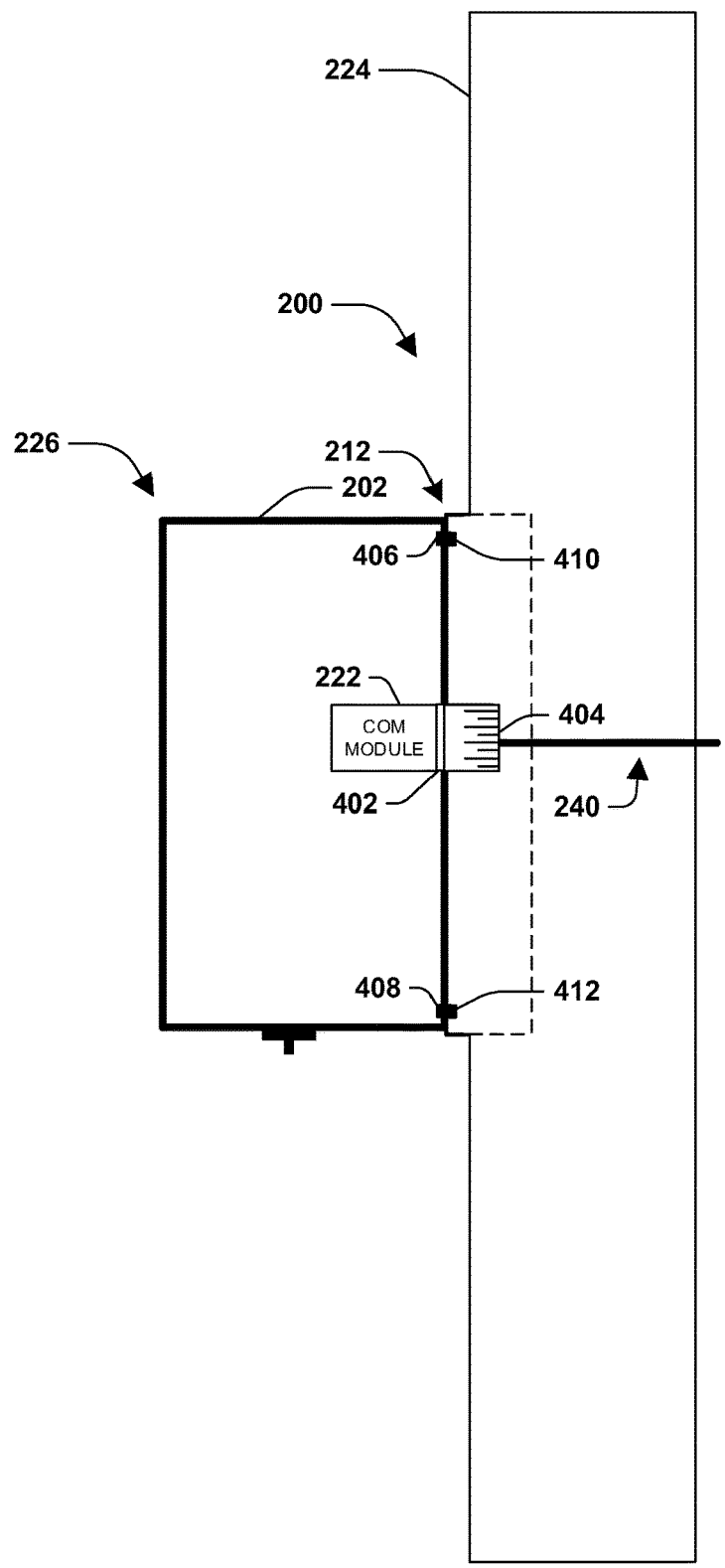
FIG. 4B is an illustration of an example of a device attached to a mounting system.

In another example, the device 226 may comprise a device connector 402, which may extended out from the device housing 202, as illustrated in FIG. 4A. The mounting plate 212 may comprise a mounting connector 404, which may be recessed into the mounting plate 212. When mated, the device connector 402 may operatively couple to the mounting connector 404 to establish the connection 240, as illustrated in FIG. 4B. For example, the connectors may mate when the device 226 attaches to the mounting plate 212, such as when a first device component 406 attach to a first mounting component 410 and a second device component 408 attached to a second mounting component 412.

It may be appreciated that the mounting system 200, including the device 226 and the mounting plate 212, is not limited to the components, structures, etc. that are illustrated and described herein. In other examples, either or both of the mounting plate 212 and/or the device 226 may comprise an antenna. The antenna can transmit and/or receive information (e.g., instructions, data collection requests, visualization to display, current device status, usage metrics, detected hygiene opportunities, maintenance information, etc.) between the mounting plate 212 and the device 226. In some examples, the antenna(s) can transmit and/or receive the information between the mounting plate 212, the device 226, and/or the remote device 242. As such, in this example, the mounting connector 216, 304, 404 can mate with the device connector 208, 302, 402 wirelessly.

Figure 5:
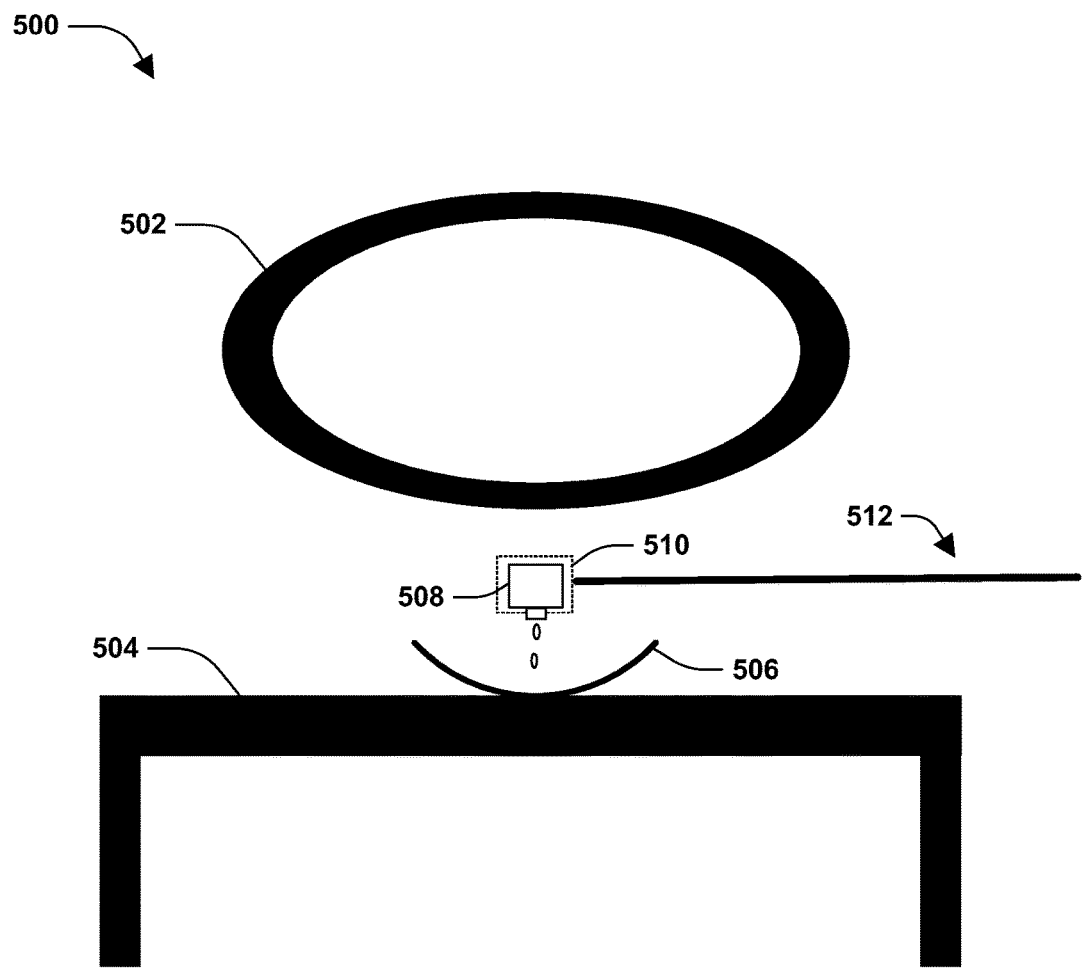
FIG. 5 is an illustration of an example of a faucet device connected to a power communication connection.

FIG. 5 illustrates an example 500 of a faucet device 508 connected to a connection 512. In an example, the faucet device 508 may be located in a bathroom (e.g., the faucet device 508 may comprise an automated touch free faucet that is mounted between a sink bowl 506 of a vanity 504 and a mirror 502 on a wall structure). The faucet device 508 may attach to a mounting plate 510 of a mounting system. A device connector of the faucet device 508 may mate with a mounting connector of the mounting plate 510 to establish the connection 512. In this way, power may be provided to the faucet device 508 and/or communication may be facilitated between the faucet device 508 and a remote device.

Figure 6:
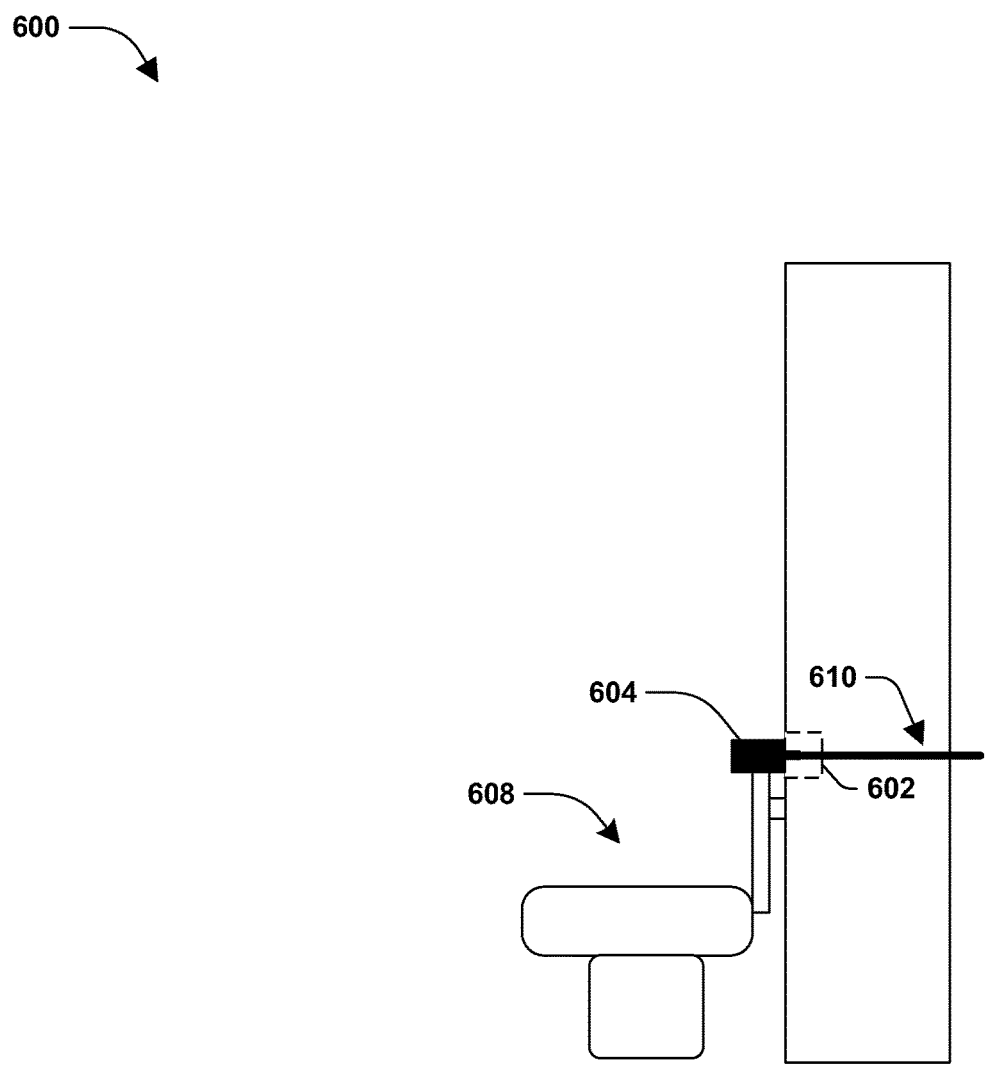
FIG. 6 is an illustration of an example of a flush valve device connected to a power communication connection.

FIG. 6 illustrates an example 600 of flush valve device 604 connected to a connection 610. In an example, the flush valve device 604 may be associated with a toilet 608 located in a bathroom. The flush valve device 604 may be configured to flush the toilet 608 based upon detecting motion of a user. The flush valve device 604 may attach to a mounting plate 602 of a mounting system. A device connector of the flush valve device 604 may mate with a mounting connector of the mounting plate 602 to establish the connection 610. In this way, power may be provided to the flush valve device 604 and/or communication may be facilitated between the flush valve device 604 and a remote device.

Figure 7:
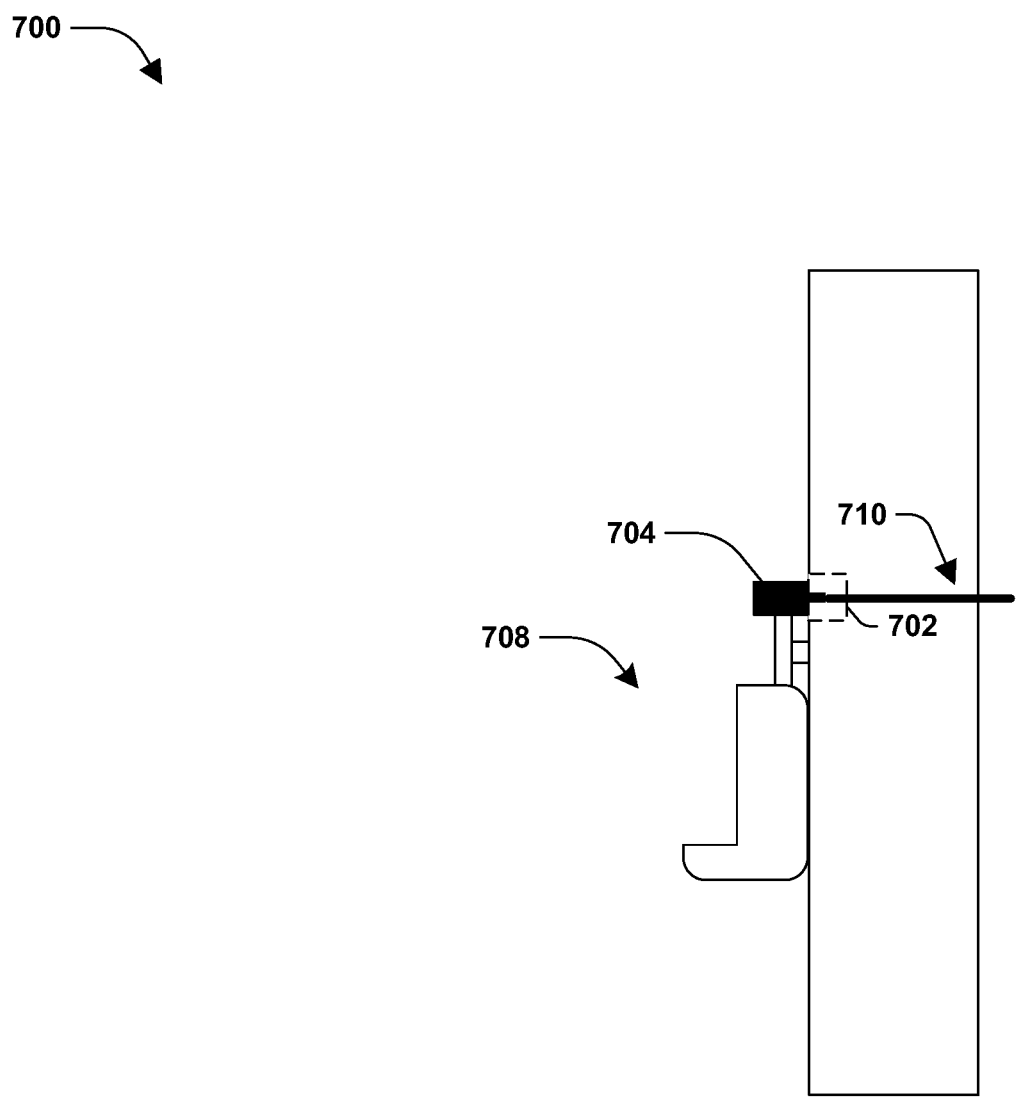
FIG. 7 is an illustration of an example of a flush valve device connected to a power communication connection.

FIG. 7 illustrates an example 700 of flush valve device 704 connected to a connection 710. In an example, the flush valve device 704 may be associated with a urinal 708 located in a bathroom. The flush valve device 704 may be configured to flush the urinal 708 based upon detecting motion of a user. The flush valve device 704 may attach to a mounting plate 702 of a mounting system. A device connector of the flush valve device 704 may mate with a mounting connector of the mounting plate 702 to establish the connection 710. In this way, power may be provided to the flush valve device 704 and/or communication may be facilitated between the flush valve device 704 and a remote device.

Figure 8:
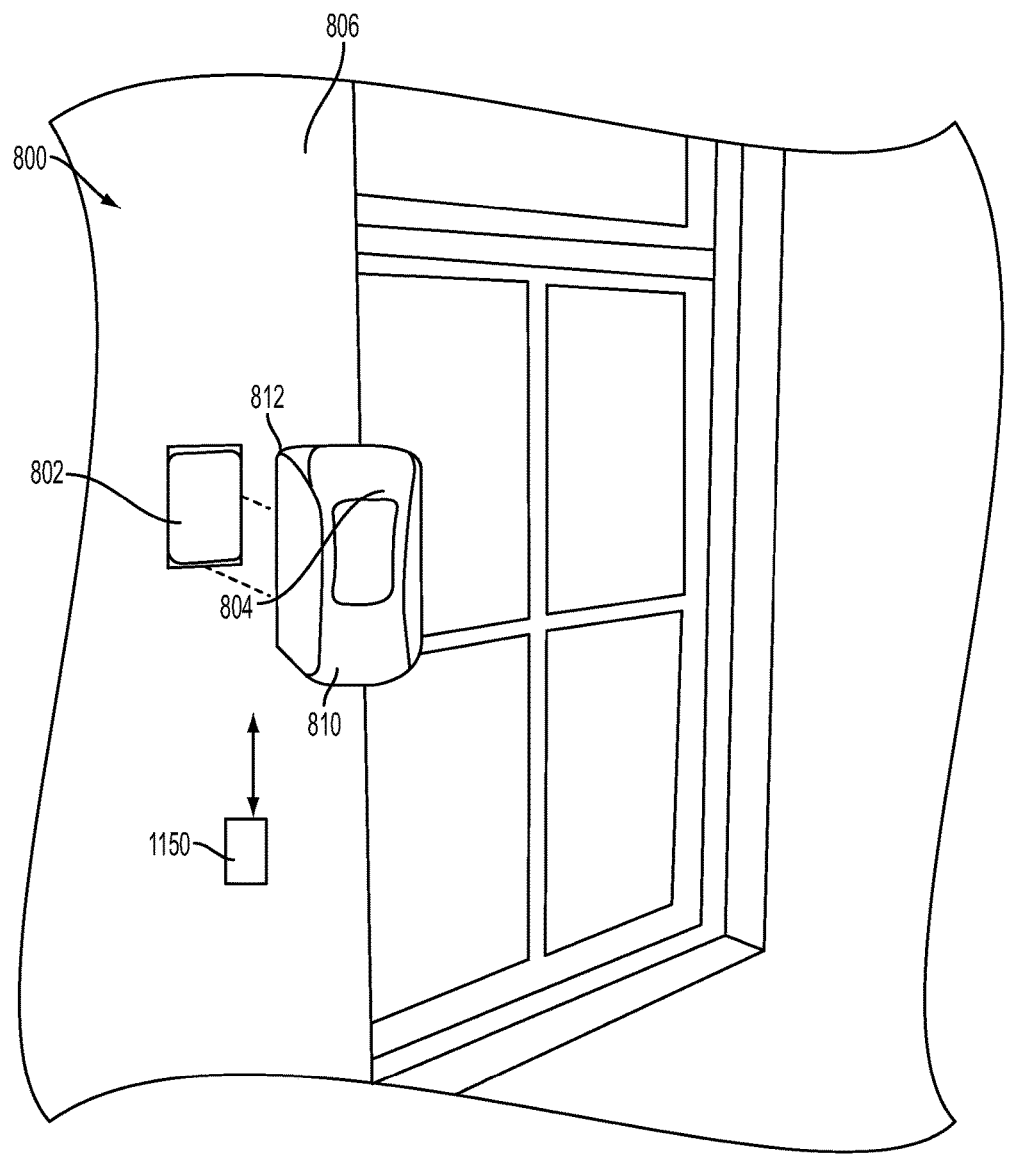
FIG. 8 is an illustration of an example mounting system.

Turning to FIG. 8, an example mounting system 800 is illustrated. The mounting system 800 comprises a mounting plate 802 and a device 804. As with the previous examples, the device 804 comprises a dispenser (e.g., a sanitizing material dispenser), a room monitor, a bathroom device, a hygiene device, a hygiene opportunity measurement device, a faucet (e.g., a touch free or automated faucet), a flush valve, a paper towel dispenser and/or other devices that may utilize power and/or communication.

In the example of FIG. 8, the device 804 is illustrated as being separated from and not attached to the mounting plate 802. However, as will be described below, the device 804 may be attached to and/or removed from the mounting plate 802. In some examples, the mounting plate 802 may be attached to a structure 806. The structure 806 comprises, for example, a stationary mounting surface such as a wall, surface, ceiling, door, window, mirror, etc. The mounting plate 802 can be attached to the structure 806 in a number of different ways, such as with fasteners (e.g., screws, bolts, nuts, nails, etc.), adhesives, welding, mechanical locking structures (e.g., snap fit designs, etc.), etc. The device 804 defines a first side 810 and a second side 812. In this example, the first side 810 faces in a direction away from the mounting plate 802 and the structure 806, such that the first side 810 may face a user. The second side 812 faces in a direction towards the mounting plate 802 and the structure 806.

Figure 9A:
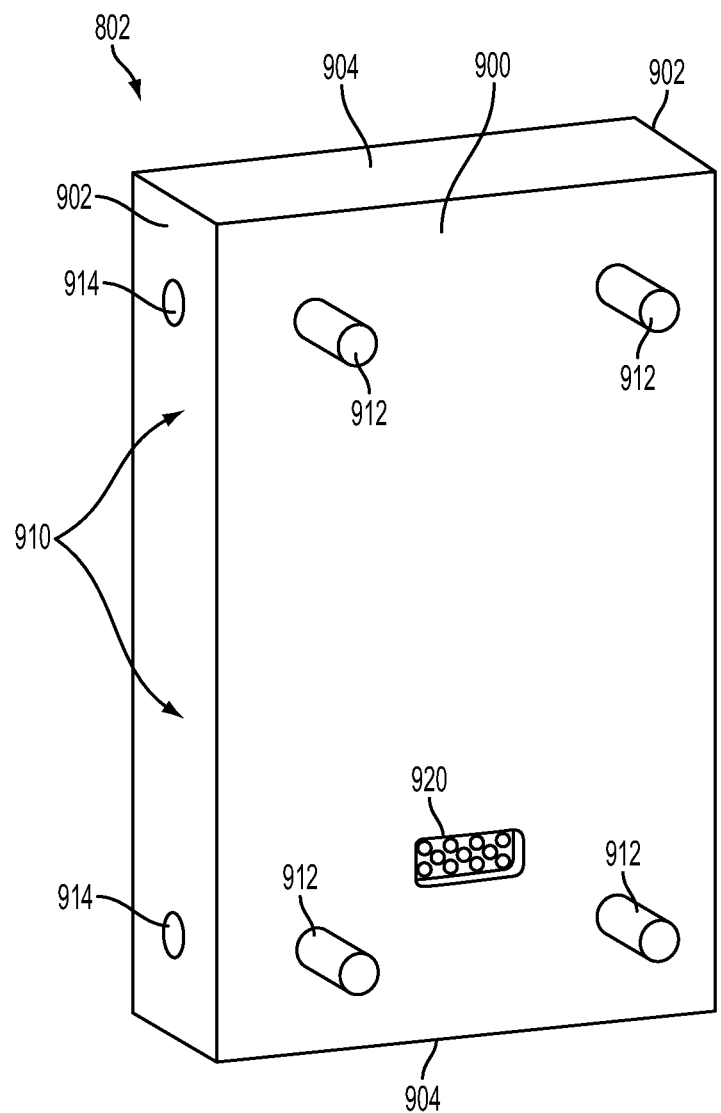
FIG. 9a is an illustration of an example mounting plate.
Figure 9B:
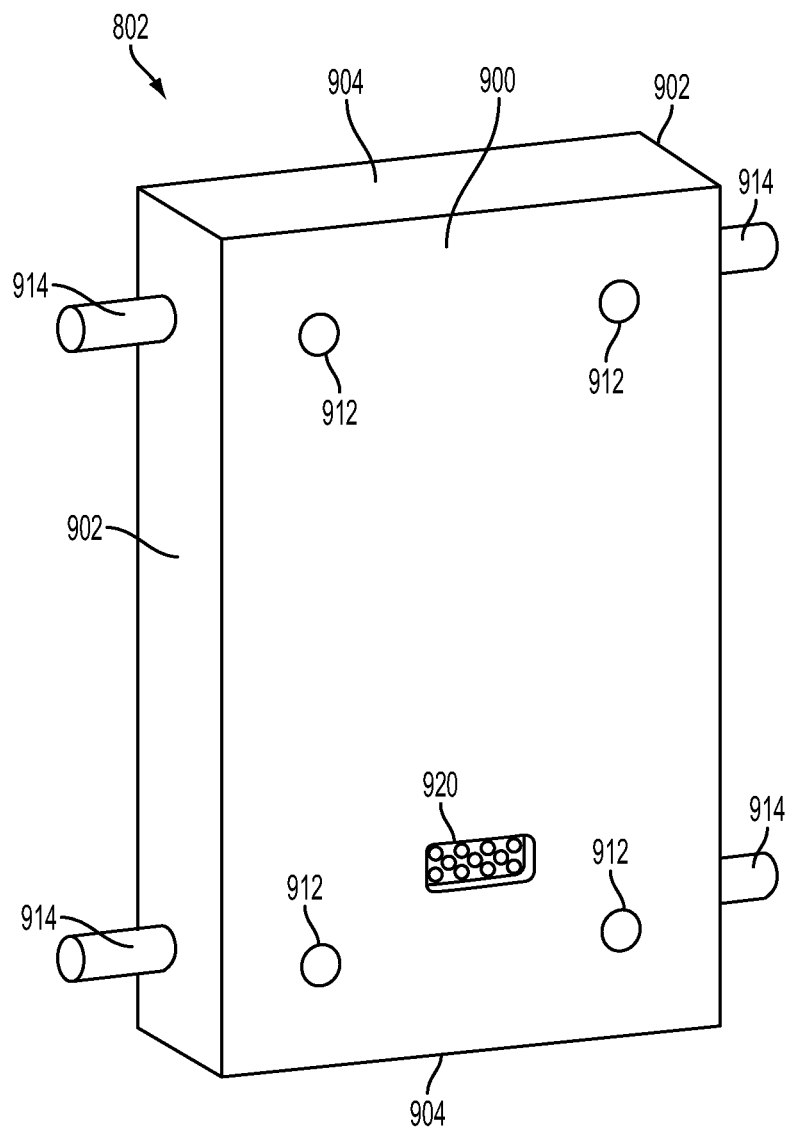
FIG. 9b is an illustration of an example mounting plate.

Turning to FIGS. 9A and 9B, the mounting plate 802 is illustrated. The mounting plate 802 comprises a first wall 900, a pair of second walls 902, and a pair of third walls 904. In an example, the first wall 900 faces in a direction away from the structure 806. That is, the mounting plate 802 is attached to the structure 806 on an opposing side from the first wall 900. As will be described below, the first wall 900 can face the device 804 and, in some examples, can contact and/or engage the device 804. In an example, the second walls 902 extend laterally along opposing sides of the first wall 900. The second walls 902 can extend substantially vertically. In an example, the third walls 904 extend laterally along opposing sides of the first wall 900 in a direction that is substantially perpendicular to the second walls 902. The third walls 904 can extend substantially horizontally in this example.

The mounting plate 802 has a substantially cuboid shape (e.g., a box shape) having six quadrilateral walls. The mounting plate 802 is not limited to such a shape, however. In other examples, the mounting plate 802 may comprise one or more rounded walls (e.g., circular, oval, etc.), one or more square walls, trapezoidal walls, or the like.

The mounting plate 802 comprises a mounting configuration 910. The mounting configuration 910 comprises one or more projections, extensions, etc. In an example, the mounting configuration 910 comprises one or more arresting portions 912 and one or more attachment portions 914.

The arresting portions 912 can be movably extended with respect to the first wall 900. In the illustrated example, four arresting portions 912 are provided, though any number (e.g., one or more) of arresting portions 912 are envisioned. In this example, the arresting portions 912 are spaced apart to define a quadrilateral shape with the arresting portions 912 defining corners of the quadrilateral shape. In other examples, the arresting portions 912 could be positioned anywhere along the first wall 900, and need not define the illustrated cross-sectional shape.

The arresting portions 912 are movable with respect to the first wall 900. In an example, the arresting portions 912 extend from openings defined within the first wall 900. The arresting portions 912 are movable between an extended position, as illustrated in FIG. 9A, and a retracted position, as illustrated in FIG. 9B. In the extended position, the arresting portions 912 can extend outwardly and in a direction away from the structure 806, such that the arresting portions 912 can contact and/or engage devices, such as the device 804, 804 that may be incompatible with the mounting plate 802.

The arresting portions 912 can be moved from the extended position, as illustrated in FIG. 9A, to the retracted position, as illustrated in FIG. 9B. In an example, the mounting plate 802 comprises an actuator, driver, one or more motors, springs, other mechanical and/or electromechanical devices, etc. that can control movement of the arresting portions 912. As will be described in detail below, the actuator, driver, one or more motors can selectively move the arresting portions 912 from the extended position to the retracted position when a compatible device 804 is to be attached to the mounting plate 802. In the retracted position, the arresting portions 912 may be retracted into the mounting plate 802, such that the arresting portions 912 do not extend past the first wall 900.

The attachment portions 914 can be movably extended with respect to the second walls 902. In an example, the attachment portions 914 extend from the second walls 902 in a direction that is substantially parallel to a plane along which the first wall 900 extends. The attachment portions 914 can therefore extend substantially perpendicularly with respect to the arresting portions 912. In the illustrated example, four attachment portions 914 are provided, though any number (e.g., one or more) of attachment portions 914 are envisioned. In this example, two attachment portions 914 are located on each of the second walls 902. That is, two attachment portions 914 are spaced apart and located on a left second wall 902 while two attachment portions 914 are spaced apart and located on a right second wall 902 (e.g., two of the attachment portions 914 on the right second wall 902 are obstructed from view).

The attachment portions 914 are movable with respect to the second walls 902. In an example, the attachment portions 914 extend from openings defined within the second walls 902. The attachment portions 914 are movable between an extended position, as illustrated in FIG. 9B, and a retracted position, as illustrated in FIG. 9A. In the extended position, the attachment portions 914 can extend outwardly from the second walls 902 in a direction away from the mounting plate 802.

The attachment portions 914 can be moved from the extended position, as illustrated in FIG. 9B, to the retracted position, as illustrated in FIG. 9A. In an example, the mounting plate 802 comprises the actuator, driver, one or more motors, springs, other mechanical and/or electromechanical devices, etc. that can control movement (e.g., extending and/or retracting) of the attachment portions 914. As will be described in detail below, the actuator, driver, one or more motors, etc. can selectively move the attachment portions 914 from the retracted position to the extended position when the mounting plate 802 is received within a compatible device, such as device 804. In the extended position, the attachment portions 914 can engage the device 804, such that the device 804 remains attached to the mounting plate 802. In the retracted position, the attachment portions 914 may be retracted into the mounting plate 802, such that the attachment portions 914 do not extend past the second walls 902.

It will be appreciated that the arresting portions 912 and the attachment portions 914 are not limited to being supported on the mounting plate 802. Rather, in some examples, at least one of the arresting portions 912 or the attachment portions 914 can be supported on at least one of the mounting plate 802 or the device 804. For example, the arresting portions 912 could be supported on the mounting plate 802 while the attachment portions 914 could be supported on the device 804. In another example, the arresting portions 912 could be supported on the device 804 while the attachment portions 914 could be supported on the mounting plate 802. In yet another example, the arresting portions 912 and the attachment portions 914 could be supported on the device 804. In these examples, the arresting portions 912 inhibit attachment of the device 804 to the mounting plate 802 (e.g., when the device 804 does not satisfy the keying feature) while the attachment portions 914 allow for the removable attachment of the device 804 to the mounting plate 802 (e.g., when the device 804 satisfies the keying feature).

The mounting plate 802 comprises a mounting connector 920. The mounting connector 920 can be located at the first wall 900. In such an example, the mounting connector 920 can face the device 804. The mounting connector 920 comprises, for example, a power over Ethernet connector, a blind mounted Ethernet connection, a cat-5 connection, a telephony connection, and/or other interface connections that may provide connectivity (e.g., a communication) and/or power. As such, the mounting connector 920 can transmit and/or receive power and/or information (e.g., data) to and/or from the device 804. In some examples, the mounting connector 920 comprises a female communication and/or power port. In other examples, the mounting connector 920 comprises a male communication and/or power port.

Figure 10:
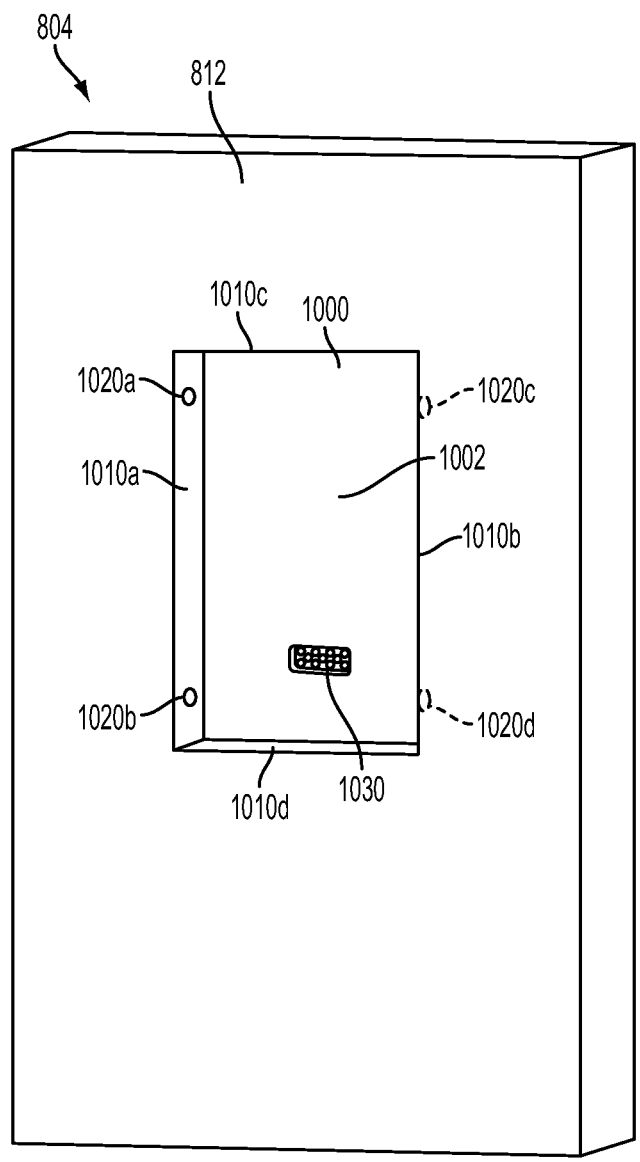
FIG. 10 is an illustration of an example device.

Turning to FIG. 10, an example of the device 804 (e.g., the dispenser) is illustrated. In this example, the second side 812 of the device 804 is illustrated. The second side 812 of the device 804 defines a recess 1000. In an example, the recess 1000 is sized and shaped to receive the mounting plate 802. For example, the recess 1000 has a cross-sectional shape (e.g., quadrilateral) that substantially matches a cross-sectional shape (e.g., quadrilateral) of the mounting plate 802. In such an example, the recess 1000 can be substantially equal in size or larger in size than the mounting plate 802. As such, the mounting plate 802 can be selectively received within the recess 1000.

The recess 1000 is defined by a facing wall 1002 and one or more recess walls 1010a-1010d. In this example, the facing wall 1002 can face towards the mounting plate 802 and, in some examples, may contact the mounting plate 802 when the mounting plate 802 is received within the recess 1000. The recess walls 1010a-1010d can define a boundary around the facing wall 1002. In an example, the facing wall 1002 is bounded by a first recess wall 1010a, a second recess wall 1010b, a third recess wall 1010c, and a fourth recess wall 1010d. The recess walls 1010a-1010d can extend outwardly from the facing wall 1002 in a direction towards the mounting plate 802.

In this example, the first recess wall 1010a and the second recess wall 1010b can extend substantially vertically and parallel with respect to each other. The first recess wall 1010a and the second recess wall 1010b can have a length that substantially matches a length of the side walls 902 of the mounting plate 802. In this example, the third recess wall 1010c and the fourth recess wall 1010d can extend substantially horizontally and parallel with respect to each other. The third recess wall 1010c and the fourth recess wall 1010d can have a length that substantially matches a length of the third walls 904 of the mounting plate 802. As such, when the mounting plate 802 is received within the recess 1000, the first recess wall 1010a and the second recess wall 1010b of the mounting plate 802 are positioned adjacent to, in proximity with and/or in contact with the second walls 902 of the mounting plate 802. In such an example, when the mounting plate 802 is received within the recess 1000, the third recess wall 1010c and the fourth recess wall 1010d are positioned adjacent to, in proximity with and/or in contact with the third walls 904 of the mounting plate 802.

The device 804 defines one or more mounting slots 1020a, 1020b, 1020c, 1020d into which the attachment portions 914 of the mounting plate 802 can be removably received. In the illustrated example, four mounting slots 1020a-1020d are provided, though, in other examples, any number (e.g., one or more) of mounting slots can be provided. The mounting slots 1020a-1020d can be located within the first recess wall 1010a and the second recess wall 1010b. For example, a first mounting slot 1020a and a second mounting slot 1020b can be located within the first recess wall 1010a. The third mounting slot 1020c and the fourth mounting slot 1020d can be located within the second recess wall 1010b.

In this example, the mounting slots 1020a-1020d can be located at substantially matching locations as the attachment portions 914, such that the attachment portions 914 can extend through the mounting slots 1020a-1020d when the attachment portions 914 are in the extended position. For example, a distance separating the first mounting slot 1020a from the second mounting slot 1020b can be substantially equal to a distance separating two of the attachment portions 914. Similarly, a distance separating the third mounting slot 1020c from the fourth mounting slot 1020d can be substantially equal to a distance separating two of the attachment portions 914. It will be appreciated that the illustrated locations of the mounting slots 1020a-1020d are not intended to be limiting. Rather, depending on the locations of the attachment portions 914, the mounting slots 1020a-1020d can be located at different locations to accommodate the attachment portions 914.

The device 804 comprises a device connector 1030. The device connector 1030 can be located at the facing wall 1002. In such an example, the device connector 1030 can face the mounting plate 802. The device connector 1030 comprises, for example, a power over Ethernet connector, a blind mounted Ethernet connection, a cat-5 connection, a telephony connection, and/or other interface connections that may provide connectivity (e.g., a communication) and/or power. As such, the device connector 1030 can transmit and/or receive power and/or information (e.g., data) to and/or from the mounting plate 802. In an example, the device connector 1030 can match the mounting connector 920 in type of connector (e.g., power over Ethernet connector, a blind mounted Ethernet connection, a cat-5 connection, a telephony connection, etc.) such that the device connector 1030 and the mounting connector 920 are compatible, matable, engageable, connectible, etc.

In some examples, the device connector 1030 comprises a male communication and/or power port. In other examples, the device connector 1030 comprises a female communication and/or power port. In an example, when the mounting connector 920 comprises a female communication and/or power port, the device connector 1030 comprises a male communication and/or power port. In another example, when the mounting connector 920 comprises a male communication and/or power port, the device connector 1030 comprises a female communication and/or power port. In these examples, the mounting connector 920 is configured to mate with (e.g., engage with, connect to, attach to, etc.) the device connector 1030 of the device to establish a connection between the mounting plate 802 and the device 804. As such, once the mounting connector 920 mates with the device connector 1030, power and/or information (e.g., a communication, data, etc.) can be transmitted between the mounting plate 802 and the device 804 through the mounting connector 920 and the device connector 1030. For example, at least one of power or communication can be provided for the device 804 through the connection.

Figure 11:
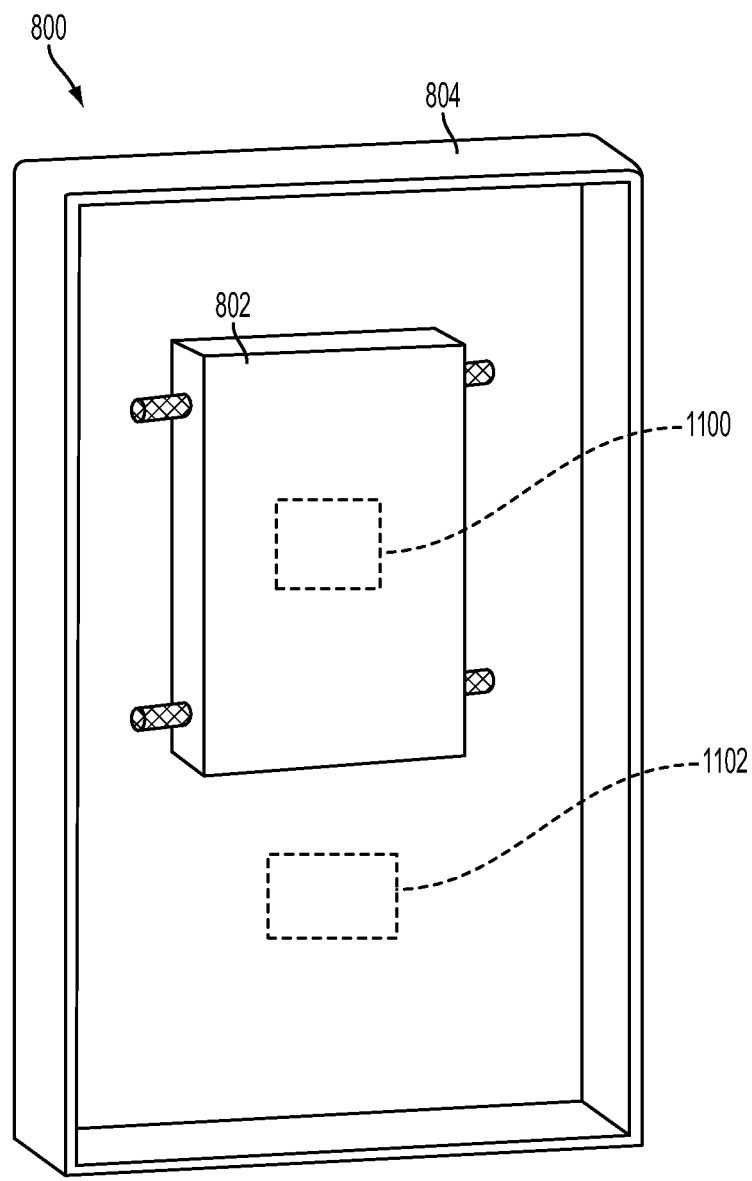
FIG. 11 is an illustration of an example mounting system.

Turning to FIG. 11, in some examples, the mounting system 800 can comprise one or more keying features 1100, 1102. In an example, the mounting plate 802 may comprise a first keying feature 1100 while the device 804 comprises a second keying feature 1102. It will be appreciated that the keying features 1100, 1102 are illustrated schematically in FIG. 11, as it is to be appreciated that the keying features 1100, 1102 comprise any number of means for communicating information between the device 804 and the mounting plate 802. Indeed, the keying features 1100, 1102, may comprise an antenna and associated software that are not limited to the illustrated positions of FIG. 11.

The keying features 1100, 1102 can allow for attachment of the device 804 to the mounting configuration 910 of the mounting plate 802. In an example, the keying features 1100, 1102 can comprise a communication system (e.g., wireless, Bluetooth, etc.) between the mounting plate 802 and the device 804. In this example, the first keying feature 1100 and the second keying feature 1102 can communicate with each other. For example, when the device 804 is in proximity to the mounting plate 802 (e.g., as illustrated in FIG. 8), the device 804 and the mounting plate 802 can communicate via the keying features 1100, 1102.

If the device 804 satisfies the keying features 1100, 1102, the keying features 1100, 1102 allow for attachment of the device 804 to the mounting configuration 910 of the mounting plate 802. In an example, the second keying feature 1102 can communicate with the first keying feature 1100 by transmitting information related to the device 804, such as the size and/or shape of the device 804, the manufacturer of the device 804, a model of the device 804, a type of refill container installed within the device 804, etc. The keying features 1100, 1102 comprise, for example, a determination that the device 804 is compatible with the mounting plate 802. Compatibility includes, for example, a proper size and/or shape of the device 804 with respect to the mounting plate 802, a proper type of device 804 (e.g., belonging to a certain supplier, manufacturer, etc.; comprising a particular type or brand of refill container; etc.), etc. If the device 804 does not satisfy the keying features 1100, 1102, then the keying features 1100, 1102 may inhibit attachment of the device 804 to the mounting configuration 910 of the mounting plate 802.

In some examples, the keying features 1100, 1102 comprise inputting a code into the mounting plate 802 and/or the device 804. For example, the mounting plate 802 and/or the device 804 may comprise a touchpad, keyboard, or other information inputting devices. The keying features 1100, 1102 may allow for a user or operator to enter a code into the mounting plate 802 and/or the device 804. When a correct code is entered, the keying features 1100, 1102 are satisfied, such that the keying features 1100, 1102 allow for attachment of the device 804 to the mounting configuration 910 of the mounting plate 802. When an incorrect code is entered, the keying features 1100, 1102 are not satisfied, such that the keying features 1100, 1102 may inhibit attachment of the device 804 to the mounting configuration 910 of the mounting plate 802.

In another example, the keying features 1100, 1102 comprise at least one of an electrical keying feature, an electromagnetic keying feature, or an electromechanical keying feature. It will be appreciated that the keying features 1100, 1102 are illustrated schematically, as the keying features 1100, 1102 comprise a number of different structures, components, devices, etc.

In an example, the keying features 1100, 1102 comprises an electrical keying feature. For example, the first keying feature 1100 and the second keying feature 1102 may comprise wireless communication devices that can communicate with each other wirelessly when the device 804 is in proximity to the mounting plate 802. If the device 804 satisfies the keying features 1100, 1102 (e.g., the first keying feature 1100), then the keying features 1100, 1102 may inhibit attachment of the device 804 to the mounting configuration of the mounting plate 802. In another example, the first keying feature 1100 and the second keying feature 1102 comprise electromechanical devices (e.g., an electromechanical keying feature), such as inductors, for example. In such an example, the first keying feature 1100 and the second keying feature 1102 can communicate with each other, such as by inductive coupling. The first keying feature 1100 (e.g., a first inductor) can magnetically couple with the second keying feature 1102 (e.g., a second inductor) to transmit information between the two keying features 1100, 1102.

In these examples, the keying features 1100, 1102 can selectively allow for the attachment of the device 804 to the mounting configuration 910 when the device 804 satisfies the keying features 1100, 1102. For example, the keying features 1100, 1102 can be in communication with the actuator, driver, one or more motors, springs, other mechanical and/or electromechanical devices, etc. that control movement (e.g., extension and retraction as illustrated in FIGS. 9A and 9B) of the arresting portions 912 and/or the attachment portions 914. Accordingly, in a possible example, the keying features 1100, 1102 can, at least partially, control movement of the arresting portions 912 and/or the attachment portions 914 by communicating with the actuator, driver, one or more motors, springs, other mechanical and/or electromechanical devices, etc., such as by transmitting a control signal to extend and/or retract the arresting portions 912 and/or the attachment portions 914.

In response to the device 804 satisfying the keying features 1100, 1102, the arresting portions 912 of the mounting plate 802 can be moved from the extended position (e.g., as illustrated in FIG. 9a) to the retracted position (e.g., as illustrated in FIG. 9b). When the arresting portions 912 are in the retracted position, the arresting portions 912 may not extend from the first wall 900, but, instead, may be retracted into the mounting plate 802. As such, the arresting portions 912 will not interfere, contact, engage, etc. the facing wall 1002 of the device 804 when the mounting plate 802 is received within the recess 1000 of the device 804. Accordingly, when the arresting portions 912 are in the retracted position, the arresting portions 912 can allow for attachment of the device 804 to the mounting configuration 910.

In addition to the arresting portions 912 moving to the retracted position when the keying feature 1100, 1102 is satisfied, the attachment portions 914 can be moved from the retracted position (e.g., as illustrated in FIG. 9a) to the extended position (e.g., as illustrated in FIG. 9b). In such an example, the mounting plate 802 can be received within the device 804. With the mounting plate 802 in place, the arresting portions 912 can be moved to the extended position. By moving to the extended position, the arresting portions 912 can extend through the mounting slots 1020a-1020d defined within the recess walls 1010a and 1010b. For example, two of the arresting portions 912 can extend through the first mounting slot 1020a and the second mounting slot 1020b of the first recess wall 1010a. Similarly, two of the arresting portions 912 can extend through the third mounting slot 1020c and the fourth mounting slot 1020d of the second recess wall 1010b. With the arresting portions 912 received within and extending through the mounting slots 1020a-1020d, the device 804 is attached with respect to the mounting plate 802, such that inadvertent detachment of the device 804 from the mounting plate 802 is limited.

In these examples, the keying feature 1100, 1102 can selectively inhibit attachment of the device 804 to the mounting configuration 910 when the device 804 does not satisfy the keying feature 1100, 1102. For example, in response to the device 804 not satisfying the keying feature 1100, 1102, the arresting portions 912 of the mounting plate 802 can remain in the extended position (e.g., as illustrated in FIG. 9a). In the extended position, the arresting portions 912 will contact/engage the facing wall 1002 of the device 804 when a user attempts to insert the mounting plate 802 into the recess 1000 of the device 804. As such, the arresting portions 912, in the extended position, can inhibit the mounting plate 802 from being received within the recess 1000, thus inhibiting attachment of the device 804 to the mounting plate 802.

Referring briefly to FIG. 8, in some examples, an external device 1150 can be provided for communicating with at least one of the mounting plate 802 or the device 804. It will be appreciated that the external device 1150 is illustrated schematically since the external device 1150 comprises a number of different structures, components, etc. For example, the external device 1150 can comprise a mobile device (e.g., a cellular phone, etc.), a tablet, a fob, a computer, etc. In at least some examples, the external device 1150 can communicate with the mounting plate 802 and/or the device 804, such as through wireless communication, Bluetooth, or the like. The external device 1150 can selectively satisfy the keying feature 1100, 1102 to allow for removable attachment of the device 804 to the mounting configuration 910. For example, when the device 804 is in proximity to the mounting plate 802, the external device 1150 can be brought into proximity to and/or into contact with the mounting plate 802 and/or the device 804. In an example, the external device 1150 can communicate (e.g., through wireless communication, Bluetooth, etc.) with the mounting plate 802 to satisfy the first keying feature 1100 (e.g., to notify the mounting plate 802 that the device 804 is compatible) such that the device 804 can be removably attached to the mounting configuration 910. Accordingly, as a result of communication with the external device 1150, the arresting portions 912 can be moved to the retracted position and the attachment portions 914 can be moved to the extended position to allow for attachment of the device 804 to the mounting configuration 910. In some examples, the external device 1150 can provide power to the device 804, such as by electrically connecting to the device, inductively coupling with the device 804, or the like.

Figure 12A:
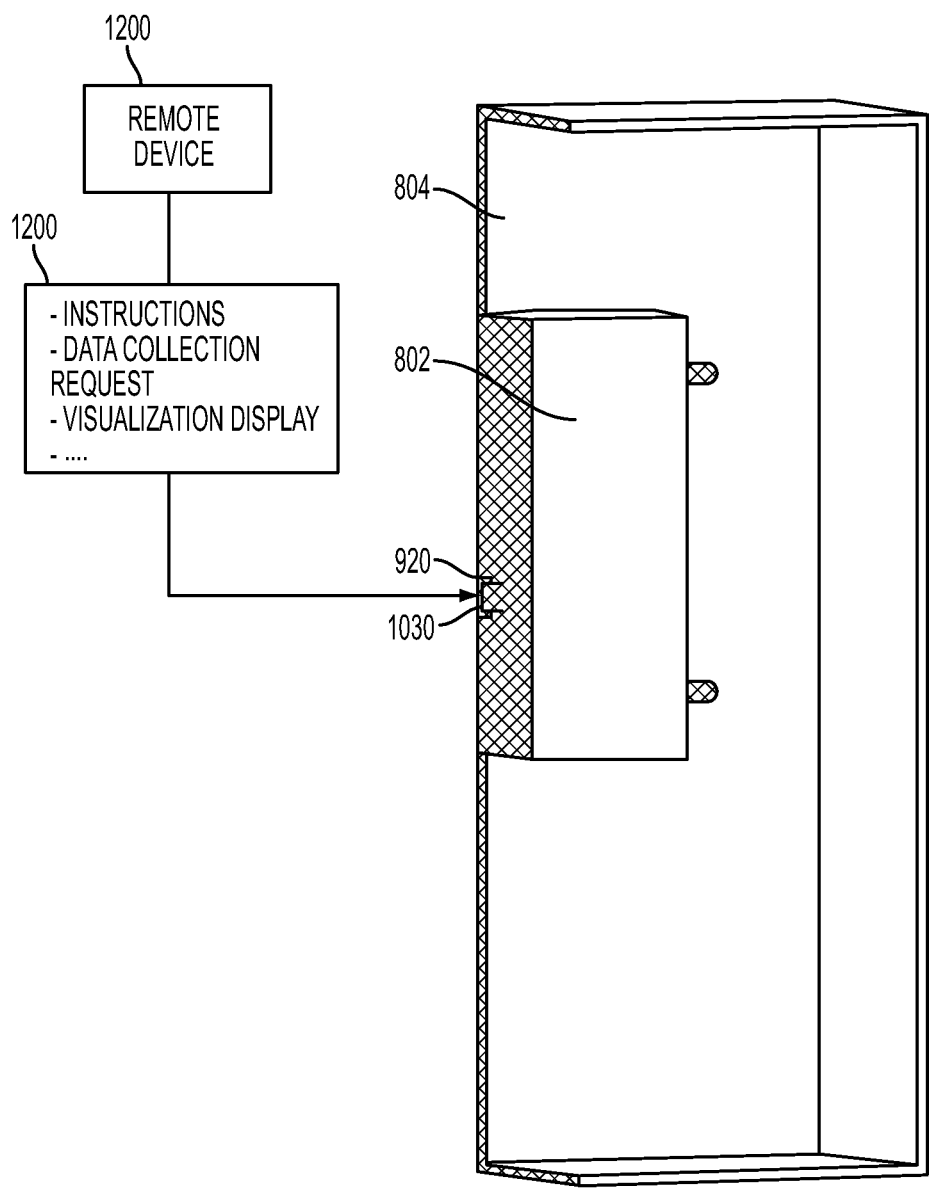
FIG. 12a is an illustration of an example mounting system.

Turning to FIG. 12A, a sectional view of the mounting system 800 is illustrated in which the device 804 is attached to the mounting plate 802. In such an example, when the device 804 and the mounting plate 802 are attached, the mounting connector 920 and the device connector 1030 can mate. As such, when the mounting connector 920 mates with the device connector 1030, a connection can be established between the mounting plate 802 and the device 804. For example, power can be provided to the device 804 from the mounting plate 802 through the connection, such as due to the mating between the mounting connector 920 and the device connector 1030. In addition or in the alternative, information can be transferred between the mounting plate 802 and the device 804 through the connection, such as due to the mating between the mounting connector 920 and the device connector 1030.

As with the previous examples, the device 804 can comprise a communication module to facilitate communication between the mounting plate 802 and the device 804. In an example, communication may be facilitated from a remote device 1200, over the connection, and to the device 804. For example, the remote device 1200 may send information 1202, such as an instruction, a data collection request, a visualization to display, and/or other information, through the mounting connector 920 and the device connector 1030 to the device 804 for processing.

Figure 12B:
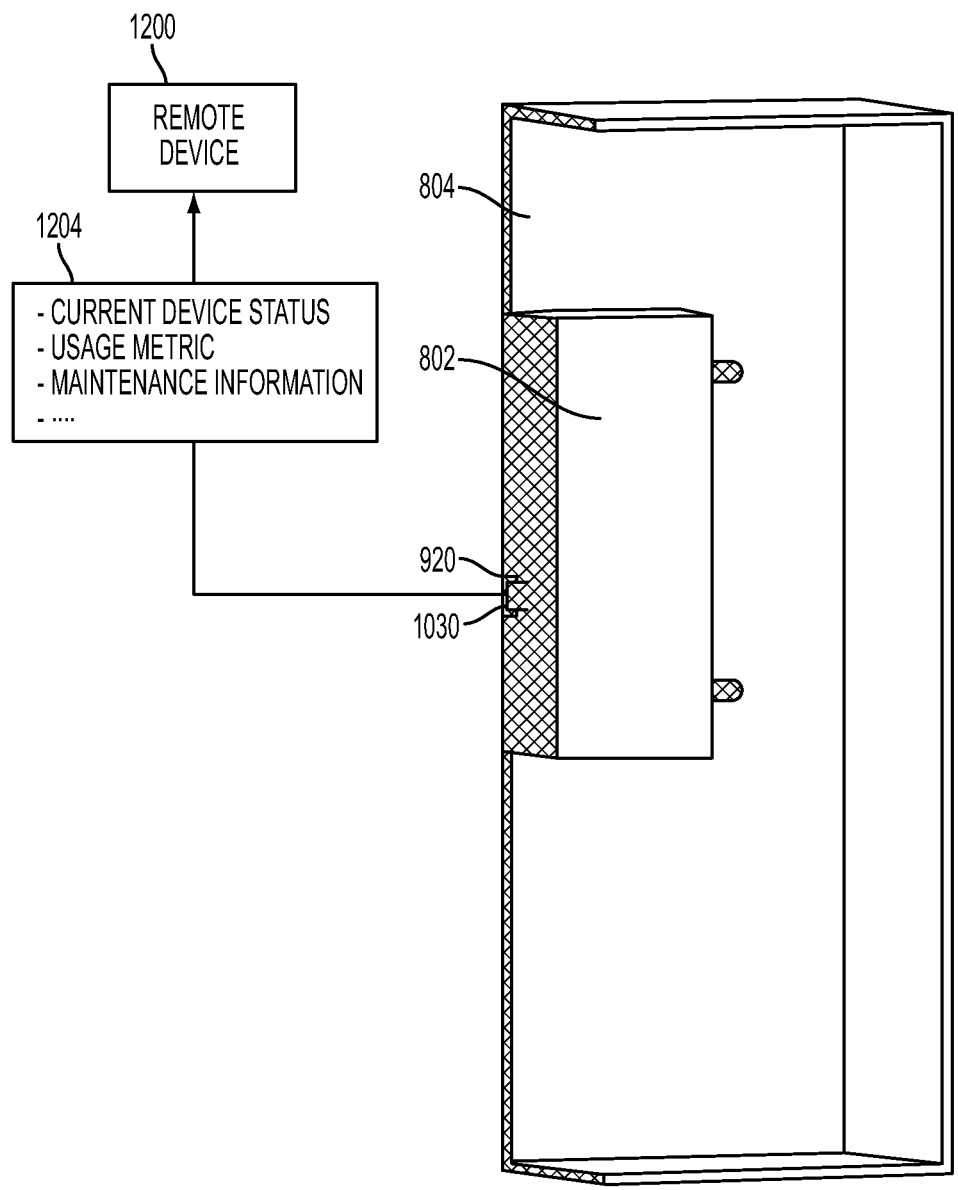
FIG. 12b is an illustration of an example mounting system.

Turning to FIG. 12B, in another example, communication may be facilitated from the device 804, through the mounting connector 920 and the device connector 1030, and to the remote device 1200. For example, the device 804 may send information 1204, such as a current device status, a usage metric, maintenance information, and/or other information through the mounting connector 920 and the device connector 1030, and to the remote device 1200.

In yet another example, the device 804 may comprise one or more power components, such as a stepdown voltage device, a current limiting device, a ground fault circuit interrupter, etc. that can control a voltage. In such an example, power can be transmitted from the mounting plate 802 to the device 804 to power the device 804. As such, power and/or communication may be provided between the mounting plate 802 and the device 804.

It will be appreciated that the mounting system 800 is not limited to the components, structures, etc. that are illustrated and described herein. In other examples, either or both of the mounting plate 802 and/or the device 804 may comprise an antenna. The antenna can transmit and/or receive information (e.g., instructions, a data collection requests, visualization to displays, current device status, usage metrics, maintenance information, etc.) between the mounting plate 802 and/or the device 804. In some examples, the antenna can transmit and/or receive information between the mounting plate 802 and a remote device (e.g., the remote device 1200). In some examples, the antenna can transmit and/or receive information between the device 804 and a remote device (e.g., the remote device 1200).

Figure 13:
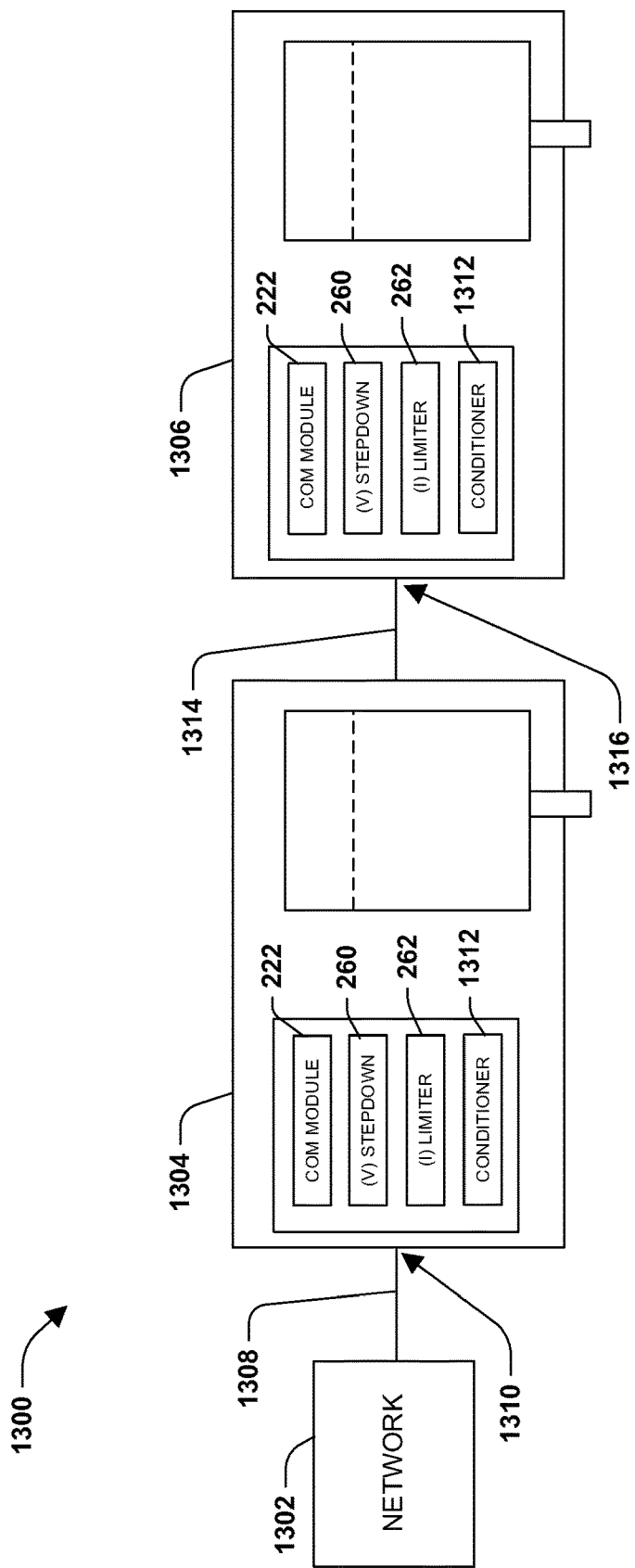
FIG. 13 is an illustration of an example system.

Turning to FIG. 13, another example system 1300 is illustrated. In this example, the system 1300 can be connected to a network 1302, such as a power supply network, a telecommunications network, a computer network, etc. In this example, the network 1302 is configured to supply power to the system 1300.

The system 1300 comprises a first dispenser 1304 and a second dispenser 1306. The first dispenser 1304 and the second dispenser 1306 may comprise a reservoir containing a product (e.g., a sanitizer, a moisturizer, etc.) and a nozzle. It will be appreciated that the first dispenser 1304 and the second dispenser 1306 are illustrated schematically, as the dispensers (e.g., the first dispenser 1304, the second dispenser 1306, etc.) comprise any number of constructions, configurations, etc. In an example, the first dispenser 1304 and the second dispenser 1306 may not be attached to a structure (e.g., a wall, a door, a window, etc.), and, instead, may rest upon a surface. In addition, while two dispensers (e.g., the first dispenser 1304, the second dispenser 1306, etc.) are illustrated in FIG. 13, it will be appreciated that any number (e.g., one or more) of dispensers may be provided as part of the system 1300.

The first dispenser 1304 can be connected to the network 1302 through a first communication cable 1308. The first communication cable 1308 comprises, for example, a power over Ethernet connection, a blind mounted Ethernet connection, a cat-5 connection, a telephony connection, and/or other interface connection that may provide connectivity and/or power for the first dispenser 1304. The first communication cable 1308 can be connected with a first communication port 1310 of the first dispenser 1304. In an example, the first communication port 1310 comprises an interface through which power and/or information transfers into and/or or out of the first dispenser 1304. The first communication port 1310 can comprise, for example, a serial port, a serial bus, a telephone connector, an Ethernet connector, other types of modular connector, power connector plugs, etc. As such, power and/or information can be transmitted between the network 1302 and the first dispenser 1304 through the first communication cable 1308 and the first communication port 1310.

In an example, the first dispenser 1304 comprises the communication module 222, the stepdown voltage device 260, the current limiting device 262, and a signal conditioner 1312. The communication module 222, the stepdown voltage device 260, the current limiting device 262, and the signal conditioner 1312 may be in electrical communication with the first communication port 1310. In an example, the stepdown voltage device 260 can step down a voltage of power that is transmitted from the network 1302 to less than about 18 volts so as to reduce the likelihood of a wet shock hazard. In an example, the signal conditioner 1312 can manipulate the incoming signal from the first communication cable 1308 such that the incoming signal may not interfere with other signals that are transmitted via the network 1302. Accordingly, the first dispenser 1304 can receive power and/or information from the network 1302, thus powering the first dispenser 1304.

The second dispenser 1306 is similar in some respects to the first dispenser 1304. For example, the second dispenser 1306 can, in some examples, comprise the communication module 222, the stepdown voltage device 260, the current limiting device 262, the signal conditioner 1312, etc. In an example, the second dispenser 1306 can be connected to the first dispenser 1304 through a second communication cable 1314. The second communication cable 1314 can be similar to the first communication cable 1308, such that the second communication cable 1314 comprises a power over Ethernet connection, a blind mounted Ethernet connection, a cat-5 connection, a telephony connection, and/or other interface connection that may provide connectivity and/or power for the second dispenser 1306.

The second communication cable 1314 can be connected with a second communication port 1316 of the second dispenser 1306 and with a communication portion of the first dispenser 1304. In an example, the second communication port 1316 comprises an interface through which power and/or information transfers into and/or out of the second dispenser 1306. The second communication port 1316 can comprise, for example, a serial port, a serial bus, a telephone connector, an Ethernet connector, other types of modular connectors, power connector plugs, etc. As such, power and/or information can be transmitted from the network 1302, through the first dispenser 1304, and to the second dispenser 1306. It will be appreciated that in other examples, additional dispensers (e.g., a third dispenser, a fourth dispenser, etc.) can be provided in series with the first dispenser 1304 and the second dispenser 1306. For example, a third dispenser can be electrically connected to the second dispenser 1306 in a similar manner that the second dispenser 1306 is electrically connected to the first dispenser 1304.

Figure 14:
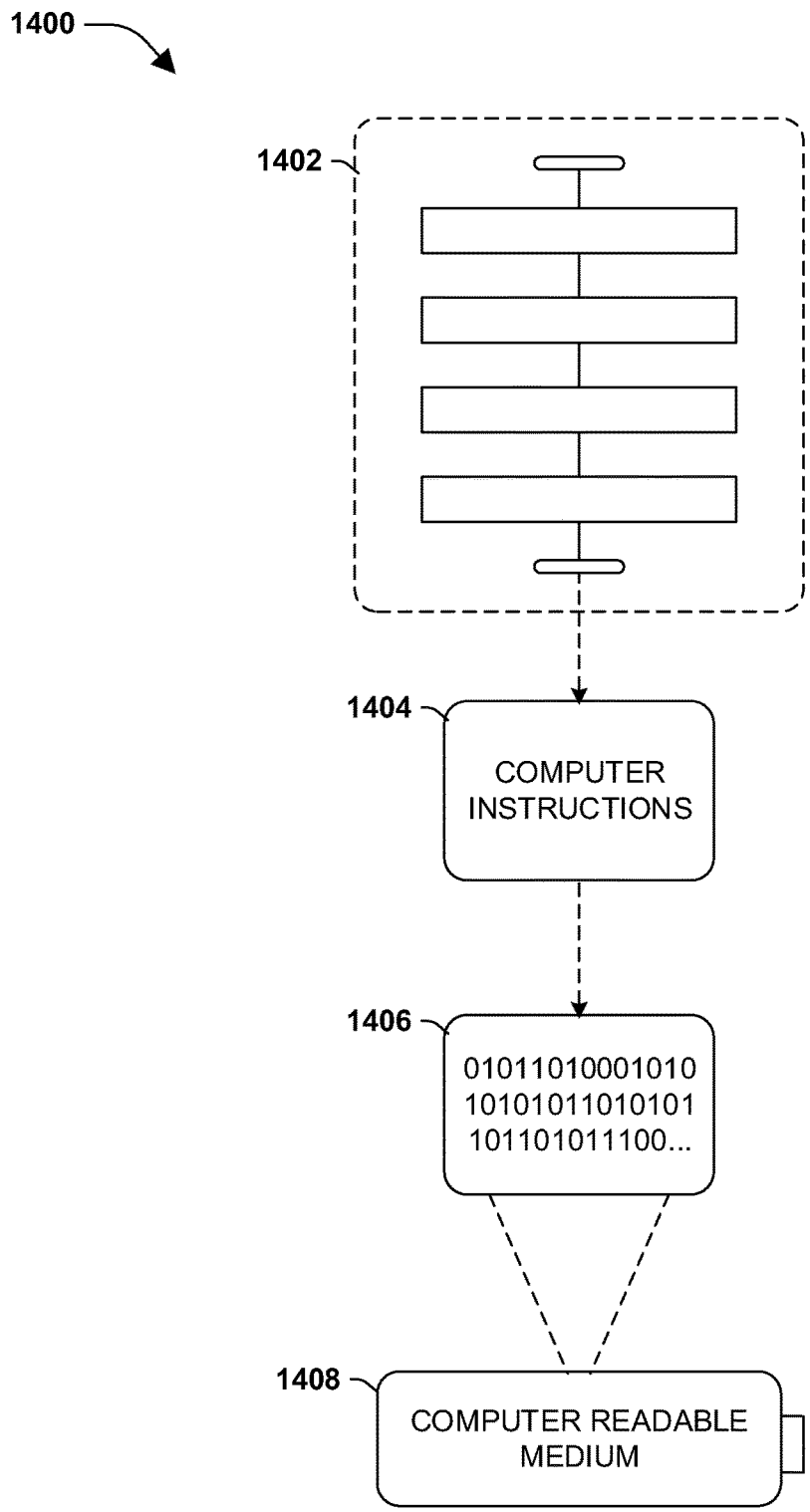
FIG. 14 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 14, wherein the implementation 1400 comprises a computer-readable medium 1408, such as a CD-R, DVD-R, flash drive, a platter of a hard disk drive, etc., on which is encoded computer-readable data 1406. This computer-readable data 1406, such as binary data comprising at least one of a zero or a one, in turn comprises a set of computer instructions 1404 configured to operate according to one or more of the principles set forth herein. In some embodiments, the processor-executable computer instructions 1404 are configured to perform a method 1402, such as at least some of the exemplary method 100 of FIG. 1, for example. In some embodiments, the processor-executable instructions 1404 are configured to implement a system, such as at least some of the exemplary system 200 of FIG. 2A, at least some of the exemplary system 300 of FIG. 3A, at least some of the exemplary system 400 of FIG. 4A, at least some of the exemplary system 500 of FIG. 5, at least some of the exemplary system 600 of FIG. 6, at least some of the exemplary system 700 of FIG. 7, at least some of the exemplary system 800 of FIG. 8, and/or at least some of the exemplary system 1300 of FIG. 13, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 15:
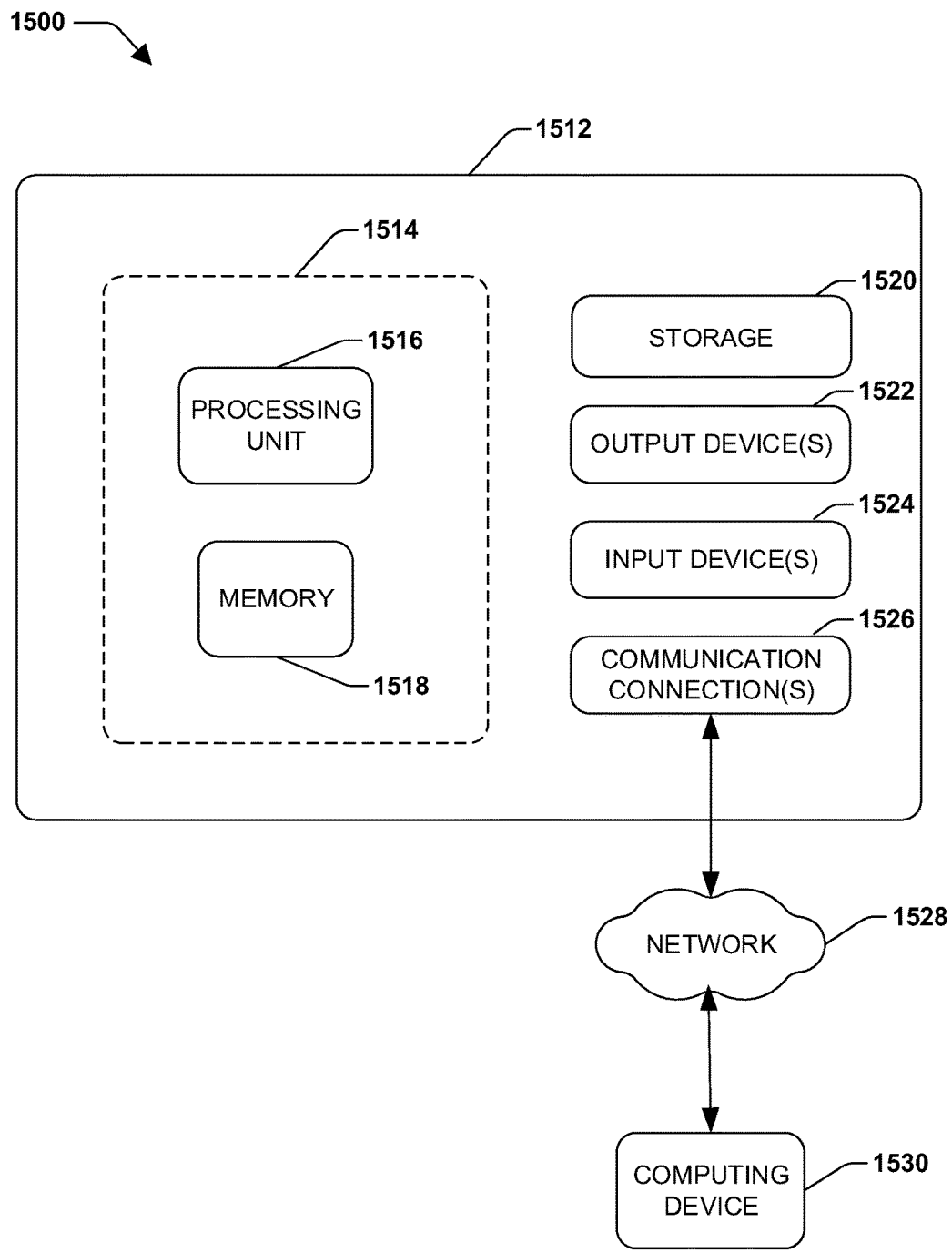
FIG. 15 illustrates an exemplary computing environment wherein one or more of the provisions set forth herein may be implemented.

FIG. 15 and the following discussion provide a brief, general description of a suitable computing environment to implement embodiments of one or more of the provisions set forth herein. The operating environment of FIG. 15 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 15 illustrates an example of a system 1500 comprising a computing device 1512 configured to implement one or more embodiments provided herein. In one configuration, computing device 1512 includes at least one processing unit 1516 and memory 1518. Depending on the exact configuration and type of computing device, memory 1518 may be volatile (such as RAM, for example), non-volatile (such as ROM, flash memory, etc., for example) or some combination of the two. This configuration is illustrated in FIG. 15 by dashed line 1514.

In other embodiments, device 1512 may include additional features and/or functionality. For example, device 1512 may also include additional storage (e.g., removable and/or non-removable) including, but not limited to, magnetic storage, optical storage, and the like. Such additional storage is illustrated in FIG. 15 by storage 1520. In one embodiment, computer readable instructions to implement one or more embodiments provided herein may be in storage 1520. Storage 1520 may also store other computer readable instructions to implement an operating system, an application program, and the like. Computer readable instructions may be loaded in memory 1518 for execution by processing unit 1516, for example.

The term "computer readable media" as used herein includes computer storage media. Computer storage media includes volatile and nonvolatile, removable and non-removable media implemented in any method or technology for storage of information such as computer readable instructions or other data. Memory 1518 and storage 1520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1512. Any such computer storage media may be part of device 1512.

Device 1512 may also include communication connection(s) 1526 that allows device 1512 to communicate with other devices. Communication connection(s) 1526 may include, but is not limited to, a modem, a Network Interface Card (NIC), an integrated network interface, a radio frequency transmitter/receiver, an infrared port, a USB connection, or other interfaces for connecting computing device 1512 to other computing devices. Communication connection(s) 1526 may include a wired connection or a wireless connection. Communication connection(s) 1526 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1512 may include input device(s) 1524 such as keyboard, mouse, pen, voice input device, touch input device, infrared cameras, video input devices, and/or any other input device. Output device(s) 1522 such as one or more displays, speakers, printers, and/or any other output device may also be included in device 1512. Input device(s) 1524 and output device(s) 1522 may be connected to device 1512 via a wired connection, wireless connection, or any combination thereof. In one embodiment, an input device or an output device from another computing device may be used as input device(s) 1524 or output device(s) 1522 for computing device 1512.

Components of computing device 1512 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1512 may be interconnected by a network. For example, memory 1518 may be comprised of multiple physical memory units located in different physical locations interconnected by a network.

Those skilled in the art will realize that storage devices utilized to store computer readable instructions may be distributed across a network. For example, a computing device 1530 accessible via a network 1528 may store computer readable instructions to implement one or more embodiments provided herein. Computing device 1512 may access computing device 1530 and download a part or all of the computer readable instructions for execution. Alternatively, computing device 1512 may download pieces of the computer readable instructions, as needed, or some instructions may be executed at computing device 1512 and some at computing device 1530.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A mounting system for providing at least one of power or communication to a device, the mounting system comprising:
   a mounting plate configured to mount to a structure, the mounting plate comprising:
      a mounting configuration comprising a keying feature that is configured to allow for removable attachment of the device to the mounting plate when the device satisfies the keying feature and inhibit attachment of the device to the mounting plate when the device does not satisfy the keying feature; and
      a mounting connector configured to mate with a device connector of the device to establish a connection between the mounting plate and the device, the mounting connector configured to at least one of:
         provide power for the device through the connection; or
         provide a communication for the device through the connection; and
   at least one of an arresting portion or an attachment portion supported on at least one of the mounting plate or the device, the arresting portion configured to inhibit the attachment of the device to the mounting plate when the device does not satisfy the keying feature, the attachment portion configured to allow for the removable attachment of the device to the mounting plate when the device satisfies the keying feature, wherein at least one of:
      the arresting portion is movable between an extended position, in which the arresting portion inhibits the attachment of the device to the mounting plate, and a retracted position, in which the arresting portion does not inhibit the attachment of the device to the mounting plate; or
      the attachment portion is movable between a retracted position and an extended position;
      wherein the keying feature comprises at least one of an electrical keying feature, an electromagnetic keying feature, or an electromechanical keying feature.

2. The mounting system of claim 1, wherein the structure comprises a stationary mounting surface.

3. The mounting system of claim 1, comprising an external device that is configured to communicate with at least one of the mounting plate or the device, the external device configured to selectively satisfy the keying feature and allow for removable attachment of the device to the mounting configuration.

4. A mounting system for providing at least one of power or communication to a device, the mounting system comprising:
   a mounting plate configured to mount to a structure, the mounting plate comprising:
      a mounting connector configured to mate with a device connector of the device to establish a connection between the mounting plate and the device, the mounting connector configured to at least one of:
         provide power for the device through the connection; or
         provide a communication for the device through the connection;
   at least one of an arresting portion or an attachment portion supported on at least one of the mounting plate or the device, the arresting portion configured to inhibit attachment of the device to the mounting plate when a keying feature is not satisfied, the attachment portion configured to allow for removable attachment of the device to the mounting plate when the keying feature is satisfied, wherein at least one of:
      the arresting portion is movable between an extended position, in which the arresting portion inhibits the attachment of the device to the mounting plate, and a retracted position, in which the arresting portion does not inhibit the attachment of the device to the mounting plate; or
      the attachment portion is movable between a retracted position and an extended position; and
   an external device that is configured to communicate with at least one of the mounting plate or the device, the external device configured to selectively satisfy the keying feature.

5. The mounting system of claim 4, wherein the arresting portion and the attachment portion are supported on the mounting plate.

6. The mounting system of claim 5, wherein the mounting plate defines a front surface and a side surface that is non-parallel to the front surface, the arresting portion supported on the front surface, the attachment portion supported on the side surface.

7. A mounting system for providing at least one of power or communication to a device, the mounting system comprising:
   a mounting plate configured to mount to a structure, the mounting plate comprising:
      a mounting connector configured to mate with a device connector of the device to establish a connection between the mounting plate and the device, the mounting connector configured to at least one of:
         provide power for the device through the connection; or
         provide a communication for the device through the connection; and
   at least one of an arresting portion or an attachment portion supported on at least one of the mounting plate or the device, the arresting portion configured to inhibit attachment of the device to the mounting plate when a keying feature is not satisfied, the attachment portion configured to allow for removable attachment of the device to the mounting plate when the keying feature is satisfied, wherein at least one of:
      the arresting portion is movable between an extended position, in which the arresting portion inhibits the attachment of the device to the mounting plate, and a retracted position, in which the arresting portion does not inhibit the attachment of the device to the mounting plate; or
      the attachment portion is movable between a retracted position and an extended position;
   wherein the keying feature comprises at least one of an electrical keying feature, an electromagnetic keying feature, or an electromechanical keying feature.

8. The mounting system of claim 7, wherein the arresting portion and the attachment portion are supported on the mounting plate.

9. The mounting system of claim 8, wherein the mounting plate defines a front surface and a side surface that is non-parallel to the front surface, the arresting portion supported on the front surface, the attachment portion supported on the side surface.

10. The mounting system of claim 7, wherein the mounting connector is configured to:

provide the power for the dispenser through the connection; and provide the communication for the dispenser through the connection.

11. The mounting system of claim 7, wherein when the device is attached to the mounting plate, the arresting portion is in the retracted position and the attachment portion is in the extended position.

12. The mounting system of claim 7, wherein the arresting portion is movable along an arresting axis and the attachment portion is movable along an attachment axis, the arresting axis non-parallel to the attachment axis.

* * * * *